United States Patent
Reardon et al.

(10) Patent No.: US 10,753,868 B2
(45) Date of Patent: Aug. 25, 2020

(54) SENSOR AND ASSOCIATED METHODS

(71) Applicant: University of York, York (GB)

(72) Inventors: Christopher Reardon, York (GB); Graham Triggs, York (GB); Thomas Krauss, York (GB)

(73) Assignee: UNIVERSITY OF YORK, Heslington (GB)

( * ) Notice: Subject to any disclaimer, the term of this patent is extended or adjusted under 35 U.S.C. 154(b) by 0 days.

(21) Appl. No.: 16/310,386

(22) PCT Filed: Jun. 16, 2017

(86) PCT No.: PCT/GB2017/051762
§ 371 (c)(1),
(2) Date: Dec. 14, 2018

(87) PCT Pub. No.: WO2017/216574
PCT Pub. Date: Dec. 21, 2017

(65) Prior Publication Data
US 2019/0331597 A1    Oct. 31, 2019

(30) Foreign Application Priority Data
Jun. 17, 2016 (GB) .................................. 1610647.8

(51) Int. Cl.
*G01N 21/45* (2006.01)
*G01N 21/77* (2006.01)
*G01N 21/21* (2006.01)

(52) U.S. Cl.
CPC ......... *G01N 21/45* (2013.01); *G01N 21/7743* (2013.01); *G01N 2021/218* (2013.01)

(58) Field of Classification Search
CPC ...... G02B 5/18; G02B 5/1819; G02B 5/1861; G02B 5/1866; G01N 21/45; G01N 21/7743
See application file for complete search history.

(56) References Cited

U.S. PATENT DOCUMENTS 5,082,629 A    1/1992 Burgess, Jr. et al.
5,442,169 A    8/1995 Kunz
(Continued)

FOREIGN PATENT DOCUMENTS

CN    203606280 U    5/2014
DE    4212281 A1    10/1993
(Continued)

OTHER PUBLICATIONS

International Search Report and Written Opinion for PCT/GB2017/051762, dated Nov. 15, 2017, 21 pgs.
(Continued)

*Primary Examiner* — Jonathan M Hansen
(74) *Attorney, Agent, or Firm* — Patent Law Works LLP

(57) ABSTRACT

There is provided a chirped diffractive element (20) in the form of a grating (22) configured for supporting a plurality of guided mode resonances (54), which resonances (54) may be considered to comprise a standing wave. Chirping the grating (22) may allow guided mode resonances (54) to be distinguishable in terms of position within a section (34) the grating (22). An incident electromagnetic field may be coupled into at least one of the sections (34) when the electromagnetic field has a wavelength value within a predetermined wavelength range and a sample has a refractive index value within a predetermined index range. The incident electromagnetic field may be reflected by at least one of the sections (34) of the grating (22) exhibiting a guided mode resonance (54). The reflected electromagnetic field from the section (34) can then be detected by directly imaging the grating (22), thereby revealing the position of the exhibited guided mode resonance (54) in the grating (22), and thereby inferring the refractive index value of the sample.

27 Claims, 10 Drawing Sheets

(56) References Cited

U.S. PATENT DOCUMENTS

| | | | |
|---|---|---|---|
| 5,991,480 | A | 11/1999 | Kunz et al. |
| 6,429,022 | B1 | 8/2002 | Kunz et al. |
| 2005/0025421 | A1 | 2/2005 | Caracci et al. |
| 2005/0201657 | A1 | 9/2005 | Tiefenthaler |
| 2005/0207012 | A1* | 9/2005 | Arnold .................... G02B 5/18 359/571 |
| 2011/0090931 | A1 | 4/2011 | Murata |
| 2015/0029504 | A1* | 1/2015 | Auner ...................... G01J 3/18 356/301 |
| 2016/0161331 | A1 | 6/2016 | Liu et al. |

FOREIGN PATENT DOCUMENTS

| | | |
|---|---|---|
| GB | 2377031 A | 12/2002 |
| WO | 9944013 A1 | 9/1999 |

OTHER PUBLICATIONS

Triggs et al., "Chirped Guided-Mode Resonance Biosensor", Optica, vol. 4, No. 2, Feb. 2017, pp. 229-234.

Kunz, "Totally Integrated Optical Measuring Sensors", SPIE vol. 1587, Jan. 1, 1991, pp. 98-113.

Sochtig, et al., "Replicated Diffractive Optical Lens Components for Laser-Diode to Fiber Coupling in Optical Bench Arrangements", SPIE vol. 3226, Aug. 1, 1998, pp. 44-55.

Kunz et al., "Miniature Integrated-optical Wavelength Analyzer Chip", Optics Letters, vol. 20, No. 22, Aug. 17, 1995, pp. 2300-2302.

Wang, S.S., et al., "Theory and Applications of Guided-Mode Resonance Filters", Applied Optics, vol. 32, No. 14, May 10, 1993, pp. 2606-2613.

A. Katzir, A. C. Livanos, and A. Yariv: "Chirped-grating output couplers in dielectric waveguides'", Applied Physics Letters, vol. 30, No. 5, Mar. 1, 1977 (Mar. 1, 1977),—Mar. 1, 1977 (Mar. 1, 1977), pp. 225-226, XP001632187.

Millar P. et al: "Fabrication of Complex Integrated Waveguide Filters Using Electron Beam Lithography", Sep. 14, 1998; Sep. 14, 1998-Sep. 18, 1998, Sep. 14, 1998 (Sep. 14, 1998), pp. 334-334, XP010307041.

Strain M et al: "Integrated Chirped Bragg Gratings on Deeply Etched Tapered III-V Waveguides", CLEO '07. 2007 Conference on Lasers and Electro-Optics, May 5-11, 2007 Baltimore, MD, USA, OSA, Piscataway, NJ, USA, May 6, 2007 (May 6, 2007), pp. 1-2, XP031231133, ISBN: 978-1-55752-834-6.

European Examination Report for European Patent Application No. 17732188.2, dated Dec. 20, 2019.

* cited by examiner $\Delta n = 2.4 \times 10^{-3}$

SENSOR AND ASSOCIATED METHODS

FIELD

The present disclosure relates to sensors and associated methods for measuring an optical property of a sample for example, but not exclusively, measuring the refractive index of a biological sample.

BACKGROUND

Current technology for testing, measuring, detecting or otherwise sensing a target property of e.g. a biological sample or an environmental sample can be bulky, complex to use and expensive to operate. Such technology may be limited to a laboratory setting which can accommodate the necessary equipment and provide staffing for using the equipment. Specialist expertise is sometimes required to provide a reliable sample testing service. Due to the relatively high cost of operating such laboratories there may only be one or several laboratories providing testing services for a relatively large population. As such, there can be a considerable backlog of samples requiring testing, thereby causing undesirable delays in diagnosing e.g. a medical condition, identifying an environmental problem, or providing any other form of testing.

Therefore there has been an interest in developing technology for testing samples in the field or in wider clinical practice. Providing at least some of the functionality of a laboratory within a smaller footprint, for example on a chip, is sometimes known as "lab-on-a-chip" technology. There have been various attempts to provide lab-on-a-chip solutions to clinical tasks such as diagnosis, as well as various other tasks requiring laboratory-level services. However, to provide the necessary functionality and reliability, there is sometimes a need to provide additional equipment which may hinder or prevent in-the-field testing or use in wider clinical practice. Some examples of "lab-on-a-chip" technology suitable for testing samples in the field or in wider clinical practice may be considered to be relatively difficult to build or package. Further, the technology may be relatively delicate and/or susceptible to breakage or failure.

One trend has been to harness the functionality of the so-called "smartphone" to provide in-the-field testing. The computational power of the inbuilt processor of the smartphone, alongside simple touchscreen interfacing, and good quality image-taking and lighting capabilities has increased interest in this technology. There have been attempts to interface smartphone technology with sensing technology such as external spectrometers and the like, but there have been difficulties in terms of handling alignment-sensitivity and shock-sensitivity. Such technology may have the potential for providing solutions to clinical and other problems, but may not necessarily be able to provide the same level of quality control and consistency which may be achievable in a formal laboratory setting.

Therefore, there may be a preference to provide at least one improved way to test samples in the field.

SUMMARY

According to an example of the present disclosure there is provided a chirped diffractive element. The chirped diffractive element may be configured to support a plurality of guided mode resonances.

The chirped diffractive element may be configured for diffracting an electromagnetic signal such as an optical beam. In use, the chirped diffractive element may be in contact with or in the vicinity of a sample having a refractive index value e.g. within a predetermined index range. The chirped diffractive element may be illuminated by an electromagnetic signal, e.g. UV, visible, near-infrared light or the like, which may be coupled into at least one of the guided mode resonances of the chirped diffractive element when the refractive index of the sample is within the predetermined index range. The sample being in contact with or in the vicinity of the chirped diffractive element may allow the electromagnetic signal to be coupled into a guided mode resonance of the chirped diffractive element. In use, when the refractive index value of the sample and the wavelength of the electromagnetic signal are such that the electromagnetic signal can be coupled into the chirped diffractive element in the form of a guided mode resonance, may cause a guided mode resonance to be exhibited or supported in at least a portion of the chirped diffractive element. Providing a chirped diffractive element that is configured to support a plurality of guided mode resonances may reduce the complexity of a sensor configured for sensing, measuring, detecting, or the like a property of a sample.

At least one of the guided mode resonances may comprise a standing wave.

The standing wave may comprise an electromagnetic wave. In some examples an electromagnetic wave may be configured to travel through a waveguide (e.g. the wave may be in the form of a travelling wave). In some examples, at least one of the guided mode resonances may comprise or be in the form of a standing wave. For example, the guided mode resonance may be exhibited as a standing wave within the diffractive element, for example, in a portion or a section of the diffractive element. As described herein, exciting/ causing a standing wave in the diffractive element may allow for operation at normal incidence (e.g. whereby an incident electromagnetic wave for coupling into the guided mode resonance may be incident at (or substantially at) 90 degrees (e.g. perpendicular) to a plane of the diffractive element (or to "the normal" of the diffractive element)). Thus, it may not be necessary to couple an electromagnetic wave or signal into the diffractive element at an angle to the normal in order excite or cause a guided mode resonance. In this case, any optics associated with the chirped diffractive element may be relatively simple to align and set-up to permit operation at or near normal incidence (e.g. for exciting or causing a standing wave in at least a portion of the chirped diffractive element). However, in some examples, it may be possible to excite or cause a guided mode resonance by coupling an electromagnetic wave or signal into the chirped diffractive element at an angle (e.g. not at or near normal incidence, or off-normal, or the like). In this example, the guided mode resonance may or may not comprise a standing wave. In some examples, at least one of the guided mode resonances may comprise a travelling wave. In some examples, at least one of the guided mode resonances may not comprise a travelling wave, for example, at least one of the guided mode resonances may comprise a standing wave.

The chirped diffractive element may be configured for coupling an incident electromagnetic signal into a guided mode resonance of the plurality of guided mode resonances. Each guided mode resonance may be supported by a refractive index value of a sample within a predetermined index range. Each guided mode resonance may be supported by an electromagnetic signal having a wavelength value within a predetermined wavelength range.

The chirped diffractive element may comprise a grating. The grating may be configured to support the plurality of guided mode resonances.

The chirped diffractive element may comprise a grating substrate for supporting the grating. The chirped diffractive element may comprise a substrate for supporting the chirped diffractive element.

The chirped diffractive element may comprise at least one grating element. For example, chirped diffractive element may comprise at least one elongated grating element, for example, a grating strip, rib, or the like.

In some examples, the grating element may comprise an elongated element, for example a strip, rib, or any other appropriate grating element structure. The at least one grating element may comprise or be in the form of periodically-repeating grating elements. The periodically-repeating grating elements may comprise parallel grating elements. The grating elements may comprise or be in the form of grating strips. In some examples, the grating element may be configured for diffracting an electromagnetic wave. Although in some examples the grating elements may comprise or be in the form of elongated grating elements, for example, a grating strip or rib, it may be possible for the grating element to comprise any appropriate form of grating structure for diffracting an electromagnetic wave, e.g. a protrusion, an upstanding protrusions (e.g. with respect to a substrate or base, or the like), an opening (e.g. within a substrate associated with the diffractive element), a slot (e.g. within the substrate), or the like. Any structure having at least one feature (e.g. profile, shape, or the like) with dimensions of the order of magnitude for causing a diffractive effect for a given electromagnetic wavelength may in some examples be considered appropriate for (e.g. comprised within, in, on, or the like) the diffractive element, e.g. the grating element, or the like.

At least one grating element may be configured to support the plurality of guided mode resonances. The grating element may be configured in any appropriate way to support the plurality of guided mode resonances. At least one grating element may be shaped to support the plurality of guided mode resonances.

At least one grating element may be shaped to support the plurality of guided mode resonances.

The at least one grating element may be profiled, dimensioned, shaped, or otherwise configured to support the plurality of guided mode resonances. The grating element may comprise at least one portion (e.g. a grating portion) including and/or defining a different dimension, shape, profile, or the like compared with at least one other portion (e.g. a grating portion) of the grating element. The grating portion may support the plurality of guided mode resonances. For example, each of the portions of the grating elements comprising, including and/or defining a different dimension, shape, profile, or the like may only support a guided mode resonance when a certain (e.g. a threshold or resonance) condition is met. For example, when an incident electromagnetic field comprises a certain wavelength (e.g. within a predetermined wavelength range), and/or a medium in the vicinity of the diffractive element comprises a certain refractive index (e.g. within a predetermined range), a guided mode resonance may or may not only be exhibited in one or more portions of the diffractive element. The grating element may be shaped in any appropriate way to enable the supporting of the plurality of guided mode resonances.

In some examples, the grating element may be configured to support the plurality of guided mode resonances by the chirped diffractive element comprising a diffractive landscape or profile. For example, the diffractive landscape or profile may comprise at least one of: at least one grating element shaped to support at least one guided mode resonance; and a grating material configured to vary the optical properties of at least part of the chirped diffractive element. For example, the grating material may comprise at least portion having an optical property (e.g. a refractive index, scattering property, or the like) which may influence the diffractive properties of the diffractive landscape or profile.

The chirped diffractive element may comprise at least one section configured to support at least one of the plurality of guided mode resonances. The at least one section may comprise or be an area, or the like of the diffractive element. The chirped diffractive element may comprise at least one area of the diffractive element configured to support at least one of the plurality of guided mode resonances.

The chirped diffractive element may comprise at least one section (e.g. an area of the diffractive element, or the like). The section may support a guided mode resonance when at least one of: a wavelength of the incident electromagnetic filed is within a predetermined wavelength range; a refractive index of a sample is within a predetermined index range; and the like. At least one of the sections (e.g. an area, or the like) of the chirped diffractive element may be distinguishable in position such that when a different guided mode resonance is exhibited or excited in the diffractive element, the position of the resonance may be indicative of at least one measured parameter e.g. the refractive index, or the like of the sample. Where there is a plurality of sections (e.g. areas), the diffractive element may be segregated, divided, partitioned, or the like into separate (e.g. segregated, divided, partitioned, or the like) sections (e.g. areas) of the diffractive element.

The section (e.g. an area, segment or the like) of the chirped diffractive element may comprise at least one grating element shaped to support at least one of the guided mode resonances. For example, the section may comprise at least one grating element configured for supporting a certain or predetermined guided mode resonance (e.g. for a predetermined combination of refractive index, wavelength, and/or the like). For example, the at least one grating element may be shaped, dimensioned, arranged, and/or otherwise configured for supporting the guided mode resonance. Therefore, in some examples, the diffractive element may comprise at least one section, wherein each section may comprise at least one grating element that is shaped (and/or otherwise configured) to support the predetermined guided mode resonance within the section. Therefore, in some examples having a plurality of sections, the grating element(s) of each section may have different characteristics (e.g. optical characteristics, or the like) which support the plurality of guided mode resonances (e.g. of the chirped diffractive element). Thus, the chirped diffractive element may in some examples be considered to be chirped by virtue of different sections of the diffractive element having different optical properties or characteristics.

It may be possible to identify at least one parameter associated with the exhibited guided mode resonance. For example, if a section (e.g. an area) of the diffractive element reflects an incident electromagnetic field, the section may be identified (e.g. by detecting, imaging, or the like), thus potentially indicating that a sample or medium in the vicinity of the diffractive element (e.g. and/or that the sample or medium in the vicinity of the section) has a certain refractive index (e.g. within a predetermined index range) and/or that an incident electromagnetic field includes a certain wavelength (e.g. within a predetermined wavelength range), and the like. In some examples, such an arrangement may be useful for identifying when the refractive index of a sample or medium in contact with or in the vicinity of the chirped diffractive element is within a predetermined range (e.g. for an electromagnetic field comprising a wavelength within a predetermined wavelength range). In some examples, the sample or medium may or may not be in contact with at least a portion of the chirped diffractive element, for example, the medium may be in the vicinity of the diffractive element. In such examples, the electromagnetic field distribution (e.g. created by the incident/coupled electromagnetic signal) may be such that at least part of the field extends at least partially into the sample or medium. In this case, the medium may support or help to support a guided mode resonance in at least a part (e.g. at least one section) of the diffractive element. Thus, in some examples, providing the medium is in the vicinity of at least part of the diffractive element, it may be possible for a guided mode resonance to be supported at least by virtue of the medium having a refractive index (or other appropriate optical parameter) within a predetermined range.

At least one grating element may comprise at least one elongated grating element, for example, a grating strip, rib, or the like.

The chirping of the chirped diffractive element may be achieved in any appropriate way. The chirping may be achieved by providing at least one elongated grating element, for example, a grating strip, rib, or the like which may be profiled, shaped, dimensioned, or the like to support the plurality of guided mode resonances. The elongated grating element may include a profile which varies in dimension along the elongated grating element (e.g. along the length of the elongated grating element).

At least one elongated grating element may comprise or include a dimension which varies along the elongated grating element. For example a width (and/or any other dimension) of at least one elongated grating element may vary along the elongated grating element.

In some examples, at least one of the elongated grating elements may include a width varying along (e.g. the length) of the elongated grating elements such that the space (e.g. the width of the space, or the like) between adjacent elongated grating elements may also vary.

At least one elongated grating element may comprise a stepped profile for defining a varying dimension at regular intervals along the elongated grating element.

In some examples, the width of the elongated grating element may vary along the elongated grating element by comprising or including a stepped profile, and/or optionally, the width may abruptly change at certain points or intervals along the elongated grating element. In some examples, the elongated grating element may comprise or include a stepped profile along at least one of the side walls of the elongated grating element. The stepped profiles may be aligned such that the abrupt changes in elongated grating element width may occur at regular and aligned intervals (e.g. with respect to the stepped profile of at least one of the other elongated grating elements) along the elongated grating element. In some examples, the width of at least one of the elongated grating elements may decrease in discrete intervals along the elongated grating elements. The intervals may each comprise a substantially cuboid-shaped portion of the elongated grating elements, which optionally may vary (e.g. decrease or increase) in dimension (e.g. width, or the like) along the elongated grating element. In some examples, the depth (e.g. the height) of the elongated grating element may be constant along the elongated grating element. In some examples, the depth of the elongated grating element may be non-constant or may vary along the elongated grating element.

The stepped profiles of adjacent elongated grating elements may be co-aligned so that co-aligned grating portions of the elongated grating elements may each comprise or include at least one equal or substantially equal dimension. The co-aligned grating portions may be cuboid-shaped portions. Each cuboid-shaped portion may comprise or include at least one equal or substantially equal dimension such as an equal or substantially equal grating portion width (and/or any other appropriate dimension).

At least one section may comprise at least one grating element shaped to support at least one of the guided mode resonances.

The at least one grating element may comprise at least one diffractive feature, for example, for causing diffraction of an electromagnetic signal or wave. The diffractive feature may comprise, for example, a protrusion, an upstanding protrusion (e.g. with respect to a substrate or base, or the like), an opening (e.g. within a substrate associated with the diffractive element), a slot (e.g. within the substrate), or the like.

In some examples where the at least one grating element is in the form of an elongated grating element, adjacent elongated grating elements of the chirped diffractive element may be aligned to support the guided mode resonances at regular intervals along the elongated grating elements. The elongated grating elements may be aligned parallel to each other. The elongated grating elements may include a constant periodicity. The stepped profiles of adjacent elongated grating elements may be aligned such that the width of each of the elongated grating elements in a direction that is perpendicular to the elongated grating elements is equal or substantially/approximately equal. A particular guided mode resonance may be supported in at least a part of the chirped diffractive element comprising or including equal or substantially/approximately equal width elongated grating elements. Thus, the chirped diffractive element may be divided or partitioned into sections supporting a particular (or number of) guided mode resonance(s) (e.g. for a given combination of wavelength, refractive index, and/or the like). In some examples the sections may comprise or be in the form of rows of equal or substantially equal width portions of elongated grating elements which are spaced apart by an equal or substantially equal spacing width between adjacent elongated grating elements.

The geometry of examples of chirped diffractive elements of the present disclosure may allow guided mode resonances to be exhibited in the sections. In examples comprising at least one section, the grating elements (e.g. elongated grating elements, strips, ribs, or the like) may be aligned to provide a substantially constant/equal width of the grating element (e.g. elongated grating element, diffractive feature, diffractive profile, or the like). In some of such examples, the guided mode resonances exhibited by the chirped diffractive element may extend substantially in a direction perpendicular to a direction along the elongated grating element for a certain wavelength and refractive index combination. If the resonance condition changes (e.g. for a change in refractive index) the position of the guided mode resonance may shift or be displaced along the elongated grating elements such that the exhibited resonance substantially extends in the direction perpendicular to the direction along the elongated grating element but may be displaced in terms of the direction along the elongated grating element. Therefore, an exhibited guided mode resonance may extend in a direction perpendicular to the elongated grating element direction, but when an optical parameter (e.g. wavelength, refractive index, or the like) or other relevant parameter (such as temperature, or the like) changes, the position of the guided mode resonance may be shifted or displaced (e.g. along the elongated grating element) such that the guided mode resonance becomes centred at a different position along the elongated grating element.

A ratio between at least one dimension of the grating element and at least one dimension of a space between adjacent grating elements may define a fill-factor of at least a portion of the chirped diffractive element. The chirped diffractive element may comprise at least two sections having different fill-factors. The at least one dimension of the grating element may be, for example, a grating element width, or the like. The at least one dimension of the space may be, for example, a spacing width between adjacent grating elements.

The ratio between the grating element width and the spacing width may define a width fill-factor ("FF") of at least a portion of the chirped diffractive element. A larger ratio may indicate a relatively wider grating element width to spacing width, whereas a smaller ratio may indicate a relatively narrower grating element width to spacing width. The diffractive element may be chirped by varying the fill-factor of at least a portion of the chirped diffractive element. The chirped diffractive element may comprise a grating element having a chirped mark-space ratio. For example, the ratio between at least one of the marks and at least one of the spaces of the chirped diffractive element may be non-constant or may vary. The mark-space ratio may be similar to or related to the fill-factor defined and/or described herein.

It will be appreciated that any dimension of the grating element could be varied in any appropriate manner, for example, the dimension (e.g. width, length and/or height) could be varied continuously along a dimension of the element; e.g. the dimension could include a tapered profile or shape. In some examples, the dimension could be varied in discrete intervals such that at least some of the discrete portions comprise abrupt transitions. In some examples, at least one of the side walls or edges of the grating element could include at least one of: a straight portion, a tapered portion, a stepped portion, or the like. In some examples, there may be any combination or variation of ways to vary the dimensions of the grating elements.

In other examples the chirping may be provided by varying at least one parameter of the diffractive element. In examples where the diffractive element is in the form of a grating, at least one grating parameter may be varied. In some examples, the grating may include a grating element periodicity which varies, for example, by providing a non-constant spacing between adjacent grating elements (e.g. an elongated grating element, strip, rib, or the like), and/or by providing a plurality of grating elements organised into sections of constant grating element periodicity but at least one section having a different grating element periodicity, or the like. In some examples the chirping may be achieved by varying the dimension/size of the space between adjacent grating elements (e.g. elongated grating elements) and/or by varying at least one dimension, shape, profile, orientation (e.g. direction), or the like of the grating elements (e.g. elongated grating elements).

In some examples, there may be a plurality of chirped diffractive elements. In some examples, there may be a plurality of diffractive elements, at least one of which may be a chirped diffractive element. Where there is a plurality of diffractive elements and an imaging system such as a camera is used to detect guided mode resonances, the field-of-view of the imaging of system may be sufficiently large to image all of the diffractive elements. In some examples, there may be a single diffractive element comprising a plurality of individual diffractive elements.

Where there is a plurality of diffractive elements, it may be possible to detect a signal from at least one of the diffractive elements. At least one of the diffractive elements may be configured to detect (or be responsive to) a different range of refractive index values and/or wavelength values. For example, at least one of the diffractive elements may be chirped to provide a different refractive index and/or wavelength response when illuminated by an electromagnetic signal. Thus, the different responses from the different diffractive elements may be used to determine, measure, or otherwise detect a target property of a sample. In some examples, the plurality of diffractive elements may provide a greater dynamic range of detection. For example, at least one of the diffractive elements may be configured to support at least one guided mode resonance for a range of wavelengths (e.g. either a relatively broad or narrow range of wavelengths). Further, at least one of the diffractive elements may be configured to support at least one guided mode resonance for a range of refractive index values (e.g. either a relatively broad or narrow range of refractive index values). Therefore, the diffractive element(s) may be configured for providing at least one of: a highly sensitive sensor; and include a high dynamic range of wavelength coverage. Such a combination of diffractive elements may be considered to provide an effect analogous to the Vernier effect, in which two or more diffractive elements having different spectral responses (e.g. reflectivity spectra) may overlap such that a broader spectral coverage may be provided and may optionally include a relatively sensitive measurement to refractive index, or the like (for example due to the chirping of at least one of the diffractive elements).

Sensors based on guided mode resonances may typically only refer to a single resonance being exploited for a particular sensing function. Examples of the present disclosure may be capable of supporting multi-wavelength guided mode resonances. For example, combining single wavelength and multi-wavelength guided mode resonance structures may allow an extension to the dynamic range of the sensing function of the diffractive element. For example, at least a first diffractive element may exhibit multiple resonances that are regularly spaced in a comb. The first diffractive element may be designed to be very sensitive to refractive index. For a given sample, as the refractive index of the sample increases, the individual resonances may sweep quickly across the field of view (e.g. of an imaging system); and as soon as a first guided mode resonance goes out of range, a second guided mode resonance may appear, and so on. At least a second diffractive element may only exhibit one guided mode resonance (and may or may not be chirped) and may be considered to be less sensitive than the first diffractive element, so the guided mode resonance may sweep much more slowly across the field of view. The combination of first and second diffractive elements may be considered to act like the hands of a clock, the first diffractive element being the equivalent of the minute-hand (e.g. relatively sensitive to changes in refractive index) and second diffractive element being the equivalent of the hour-hand. The combination of diffractive elements may thereby afford readout with high sensitivity and large dynamic range.

According to an example of the present disclosure there is provided a sensor apparatus. The sensor apparatus may comprise a chirped diffractive element according to any example described herein. The sensor apparatus may comprise a housing. The housing may be for or configured for supporting the chirped diffractive element. The sensor apparatus may comprise an illuminator. The illuminator may be configured for illuminating the chirped diffractive element with an electromagnetic signal, wave, or the like. The sensor apparatus may comprise a detector for detecting an electromagnetic signal coupled into at least one of the guided mode resonances, for example, which may be supported by the chirped diffractive element. The detector may comprise an imaging device.

The sensor apparatus may comprise an optical component. The optical component may comprise or include any appropriate component, for example, at least one of: a mirror, prism, beam splitter or the like. The optical component may be configured for directing the electromagnetic signal from the guided mode resonance to the detector.

A reflected electromagnetic signal path may be defined between the diffractive element and the detector. The reflected signal path may be perpendicular to an illuminating electromagnetic signal path defined between the illuminator and the diffractive element.

The sensor apparatus may be configured for operation at normal incidence and/or reflection such that a relatively simple set-up may be provided. For example, the optical components may be relatively simple and/or inexpensive to set-up. Further, the components may be securely mounted to or in the housing.

The optical component may be configured to direct, for example reflect, electromagnetic signal from the illuminator towards the chirped diffractive element. The optical component may be configured to direct, for example transmit, electromagnetic signal from the chirped diffractive element towards the detector.

The optical component may comprise a beam splitter, mirror, prism, and/or the like. The optical component may provide a relatively compact set-up, for example, due to providing a folded or part-folded geometry of electromagnetic signal paths.

The sensor apparatus may comprise a substrate for supporting the diffractive element. The substrate may be oriented for allowing an incident electromagnetic signal to enter and/or traverse a portion of the substrate to illuminate the diffractive element. The substrate may be oriented for allowing the diffractive element to re-direct the electromagnetic signal, and optionally for allowing re-directed, for example reflected, electromagnetic signal to traverse and/or exit the substrate.

The substrate may provide a support for the diffractive element. The substrate may be provided (e.g. mounted) in the housing such that the diffractive element is provided on (e.g. facing outwardly of) an outer surface of the housing. Such an arrangement may facilitate simpler interfacing with other components for testing and/or measurement purposes.

The detector may comprise an imaging device and/or optionally a focusing element, for example a lens or the like, for imaging the diffractive element onto the imaging device.

The imaging device may comprise a camera arrangement. A camera arrangement may be a relatively inexpensive arrangement for detecting guided mode resonances, and may reduce any requirement for a complex, and/or difficult-to-align optical arrangement.

The Illuminator may comprise a narrowband or monochromatic spectral source, for example, any appropriate source for producing an electromagnetic signal such as a laser diode or light emitting diode, or the like.

The illuminator may comprise a collimator, e.g. a focusing element such as a lens, for collimating light from the illuminator. It will be appreciated that any appropriate illuminator may be used, e.g. any type of laser (for example a semiconductor-based laser diode such as a Vertical Cavity Surface Emitting Laser (VCSEL), double hetero-structure, quantum well, distributed Bragg reflector, distributed feedback, edge-emitting diodes, or the like; a solid-state diode pumped laser; or the like), any type of light-emitting diode (LED), or the like. A possible advantage of using an electrically pumped diode may be that the sensor apparatus may be relatively compact.

Each of the components of the sensor apparatus may be connected to, mounted or provided in the housing in any appropriate way. The optical arrangement may be relatively simple to align and relatively distortion/aberration-free. In some examples the sensor apparatus may comprise optical components operating away from normal incidence/reflectance relative to the diffractive element, it may be simpler and/or more compact to operate at normal incidence/reflectance relative to the diffractive element. Mass manufacturing of the sensor apparatus may be simpler, less expensive, and/or the like, if the components can be aligned to operate under the condition of normal incidence/reflectance of the electromagnetic field (e.g. a light beam).

Due to the relatively simple geometric arrangement of the optical components supported in/by the housing, the housing may be relatively compact. Reducing the size of the housing may make the sensor apparatus easier to transport, thereby potentially increasing the ease of providing/using/the applicability of the apparatus in the field. It will however be appreciated that any appropriate optical arrangement may be provided, which may provide for operation at, near or away from normal incidence (e.g. with respect to the diffractive element). The housing may be relatively rugged, waterproof, and/or the like so that the sensor apparatus may be used in the field and/or in wider clinical practice. Thus the sensor apparatus may be considered to be relatively rugged, robust and/or relatively simple to build and/or package. At least by virtue of the robust nature of the sensor apparatus, the sensor apparatus may be suitable for protecting the internal components from damage such as caused by external impacts, shocks, or the like. The sensor apparatus may include any appropriate connection (e.g. wireless or wired) to communicate data to/from the apparatus. The sensor apparatus may include an inbuilt power source (not shown) such as a battery or the like. The sensor apparatus may include any processor and/or memory for providing computational functionality.

According to a further example of the present disclosure, there is provided a sensor for determining a refractive index value of a sample. The sensor may comprise a grating configured to support a plurality of guided mode resonances. The grating may be configured for coupling an incident electromagnetic signal into a guided mode resonance of the plurality of guided mode resonances. Each guided mode resonance may be supported by a refractive index value of a sample within a predetermined index range and/or the electromagnetic signal having a wavelength value within a predetermined wavelength range.

According to an example of the present disclosure, there is provided a diffractive element configured to support a plurality of guided mode resonances. The diffractive element may be chirped to provide the support for the plurality of guided mode resonances. The diffractive element may be configured for supporting a plurality of guided mode resonances for an electromagnetic signal incident on the diffractive element at a certain angle. For example, a plurality of wavelengths of the electromagnetic signal may be simultaneously supported in the form of guided mode resonances for a given combination of incident angle and/or refractive index. In some examples a plurality of refractive indices (e.g. a range thereof) may simultaneously support a plurality of guided mode resonances for a given combination of incident angle and/or wavelength.

According to an example of the present disclosure there is provided a method of detecting an optical property of a sample. The method may comprise chirping a diffractive element. The method may comprise coupling an electromagnetic signal into at least one guided mode resonance supported by the chirped diffractive element. The method may comprise detecting a guided mode resonance.

The method may comprise coupling the electromagnetic signal into the at least one guided mode resonance, for example, so that a standing wave, or the like, may be formed.

The method may comprise partitioning the diffractive element into a plurality of sections, for example partitioned areas, at least one of the sections being configured for supporting at least one guided mode resonance.

At least one of the sections may comprise a grating element configured for supporting the at least one guided mode resonance. The grating element may be configured for supporting the at least one guided mode resonance by being, for example shaped or the like.

The method may comprise providing a sample at the chirped diffractive element. The method may comprise illuminating the chirped diffractive element with the electromagnetic signal. The method may comprise imaging the chirped diffractive element to detect any reflected electromagnetic signal.

The method may comprise determining a position of a guided mode resonance on the chirped diffractive element. Determining the position may comprise, for example, imaging the position, or the like.

For example, the position of the guided mode resonance on the chirped diffractive element may correspond to at least one of the sections of the chirped diffractive element. For example, at least one of or each of the sections may comprise at least one grating element configured (for example shaped) to support a particular guided mode resonance for a particular combination of wavelength, refractive index, and/or the like. Therefore, the position of the resonance may indicate which section of the diffractive element supports the guided mode resonance, and optionally wherein the particular properties of the grating element in the section may indicate the refractive index of a sample, or the like.

The method may comprise determining the refractive index value by referring to a pre-calibrated data set indicating the position of a guided mode resonance for a refractive index value within a predetermined index range and/or for a wavelength within a predetermined wavelength range.

The method may comprise performing an assay for determining a target property of a sample, for example, during at least one of the steps of the assay.

The method may comprise binding a target species such as a bacterium, virus, protein, or the like, to a surface of the diffractive element, for example a target site. Such binding may cause a change in the optical properties (e.g. refractive index, or the like) of the diffractive element such that a guided mode resonance may or may not be supported. The method may comprise detecting a guided mode resonance to identify the binding of the target species to the target site.

The method may comprise providing a control chirped diffractive element to determine a guided mode resonance response as a function of at least one of: refractive index and wavelength, and/or the like, when a control medium is provided. The control chirped diffractive element may not form part of the same chirped diffractive element, for example, there may be a plurality of chirped diffractive elements provided. In some examples, the same diffractive element may comprise two or more sections, at least one of which may comprise or be the control, and at least another one of which may comprise or be a sample-testing diffractive element.

Aspects, features or parts of any example or aspect described and/or illustrated herein may be readily combined with, and/or incorporated into any other example or aspect described and/or illustrated herein. Any advantageous and/or beneficial and/or useful feature described in relation to any example or aspect described and/or illustrated herein may be readily incorporated into or provided within any other example or aspect described and/or illustrated herein.

BRIEF DESCRIPTION OF THE DRAWINGS

These and other examples of the present disclosure will now be explained, by way of example only, with reference to the following drawings, in which:

FIG. 10b is a position-intensity graph illustrating the shift in resonance position of FIG. 10a;

BRIEF DESCRIPTION OF THE TEXT IN THE DRAWINGS

Figure 2:
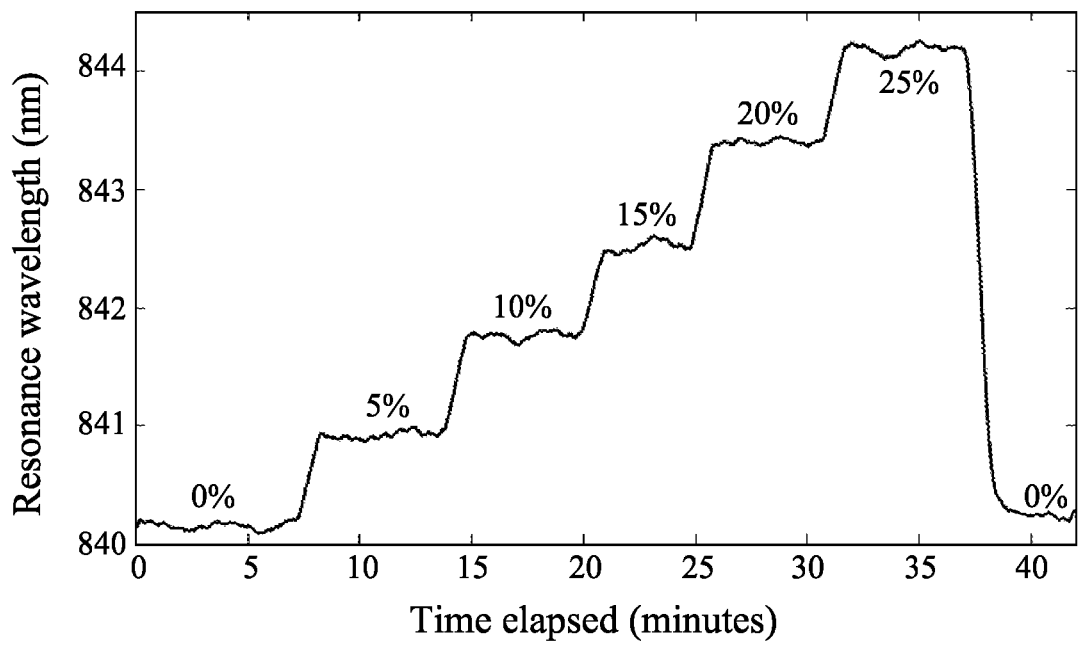
FIG. 2 is a graph illustrating a resonant wavelength response as a function of time from a regular grating such as is illustrated by FIG. 1.
Figure 7:
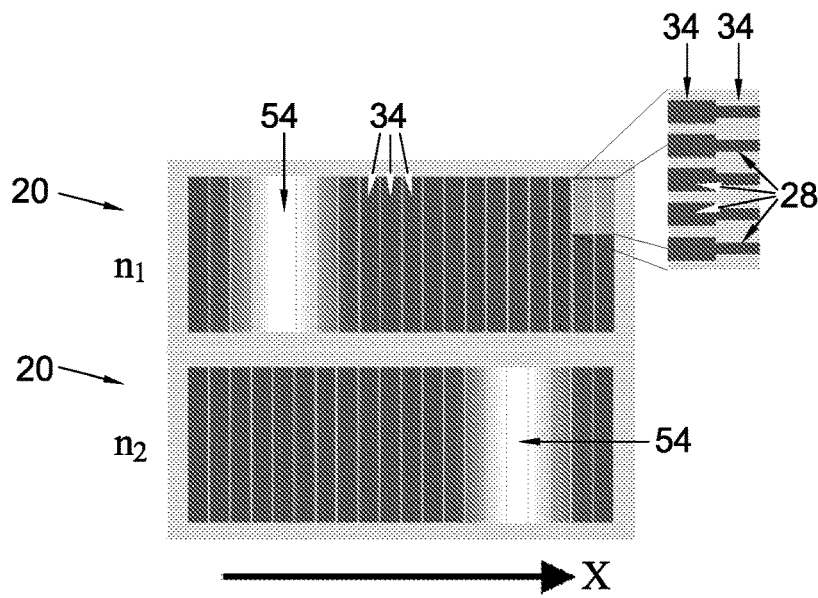
FIG. 7 is a schematic illustration comparing different possible positions for resonances to be exhibited within a diffractive element in accordance with the present disclosure.
Figure 9:
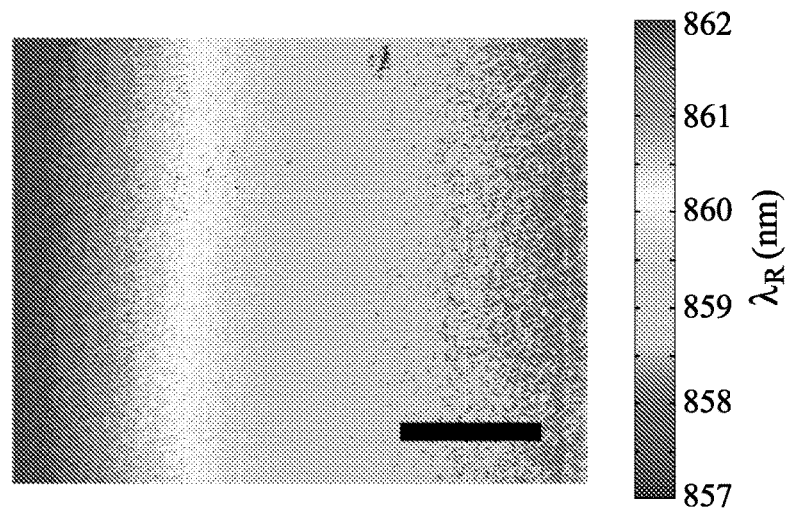
FIG. 9 is a map of the resonance response of an example diffractive element in accordance with the present disclosure.
Figure 10A:
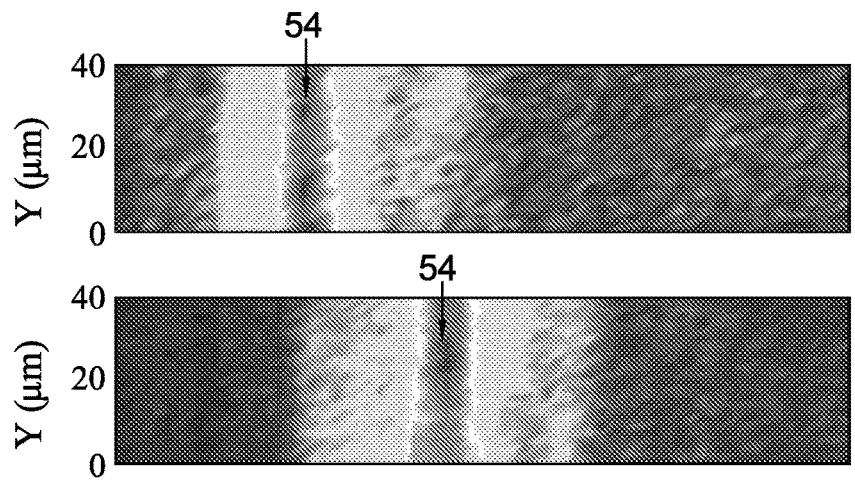
FIG. 10a includes comparative images of the shift in resonance position of a guided mode resonance exhibited by the example diffractive element in accordance with the present disclosure for different glucose solutions.
Figure 10B:
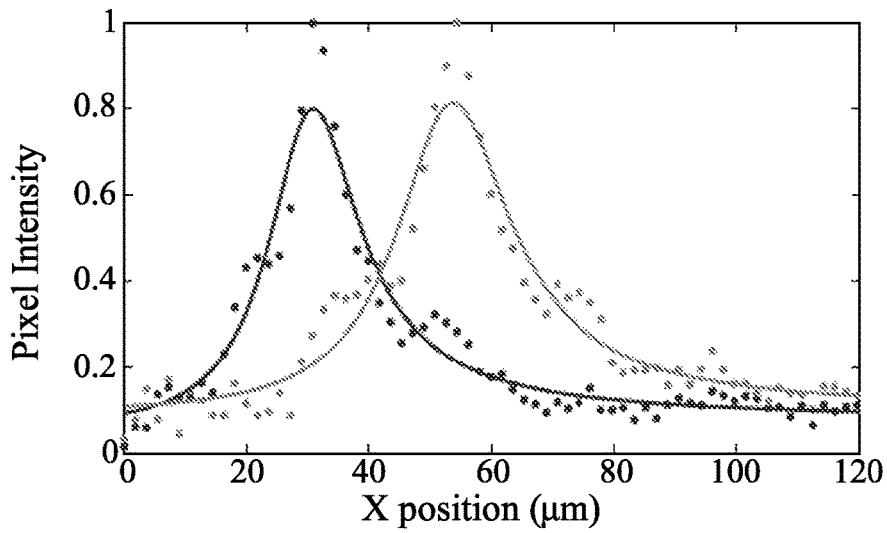
Figure 11:
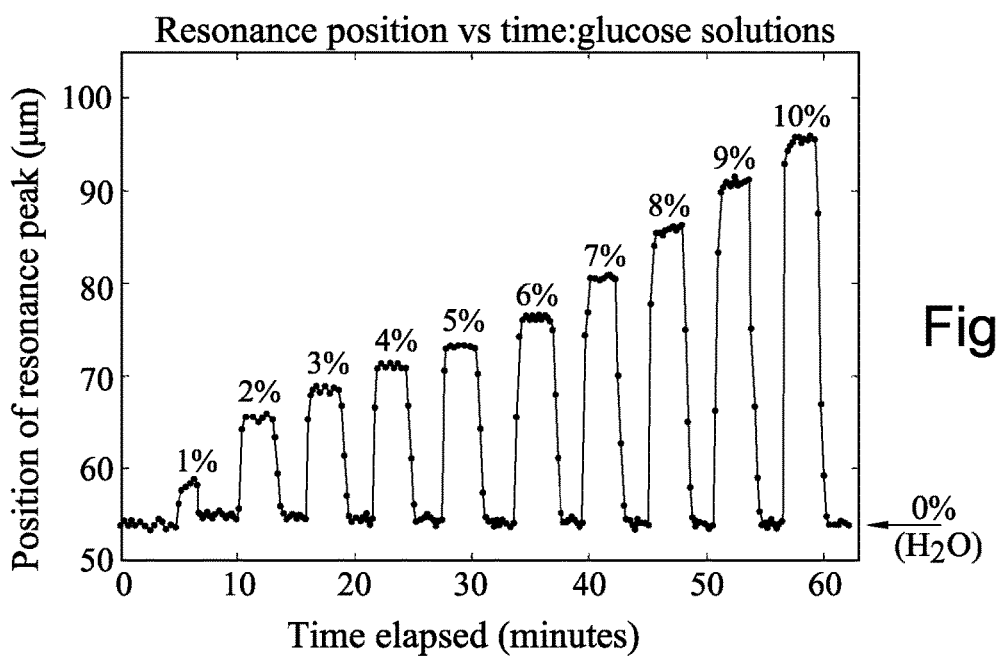
FIG. 11 is a graph of guided mode resonance position vs time for different glucose solutions sensed by an example diffractive element in accordance with the present disclosure.

A brief description of the information accompanying some of the drawings will now be described:

FIG. 2 illustrates experimental data of the resonance wavelength (nm) as a function of time elapsed (minutes) exhibited by a diffractive element, wherein the concentration of a glucose solution is varied in percentage terms as indicated by the graph;

FIG. 6 is an image taken of a guided mode resonance exhibited by a diffractive element according to an example of the present disclosure for a change in refractive index of $\Delta n=2.4\times10^{-3}$, wherein the scale bar at the top right side of FIG. 6 represents 100 μm along the diffractive element;

FIG. 7 is a colour map of the resonance wavelength (nm) reflected by the diffractive element according to an example of the present disclosure, wherein the resonance wavelength is a function of the colour of the map ($\lambda_R$=862 nm is exhibited on the left hand side of the image and the resonance position moves along the diffractive element when the wavelength changes such that $\lambda_R$=857 nm is exhibited on the right hand side of the image), and wherein the scale bar at the bottom right side of FIG. 7 represents 100 μm along the diffractive element;

FIG. 8a is an intensity map (in false colour) of two images taken of a guided mode resonance in a diffractive element according to an example of the present disclosure for a change in refractive index, wherein the Y axis is in μm and the X-axis is also in μm;

FIG. 8b is a graph corresponding to the pixel intensity of FIG. 8a, wherein the normalised pixel intensity is provided as a function of diffractive element position (in μm);

FIG. 9 is a graph of resonance position vs. time for glucose solutions of varying concentrations (0% through to 10% in 1% steps). The position of a guided mode resonance peak (e.g. peak intensity) position (in μm) is provided as a function of time elapsed (in minutes), wherein the concentration of the glucose solution is varied in percentage terms as indicated in the figure;

FIG. 10 is a graph of guided mode resonance X-position (in μm) vs. time elapsed (minutes) for water; and FIG. 11 is a graph of the measured resonance position (in μm) as a function of time elapsed (minutes), wherein the IgG assay is followed and the steps of the assay (which are indicated by the accompanying text of the graph) cause a change in measure resonance position during the assay. The inset figure is an expanded view of a change in resonance X position within the indicated time interval.

DETAILED DESCRIPTION OF THE DRAWINGS

Figure 1:
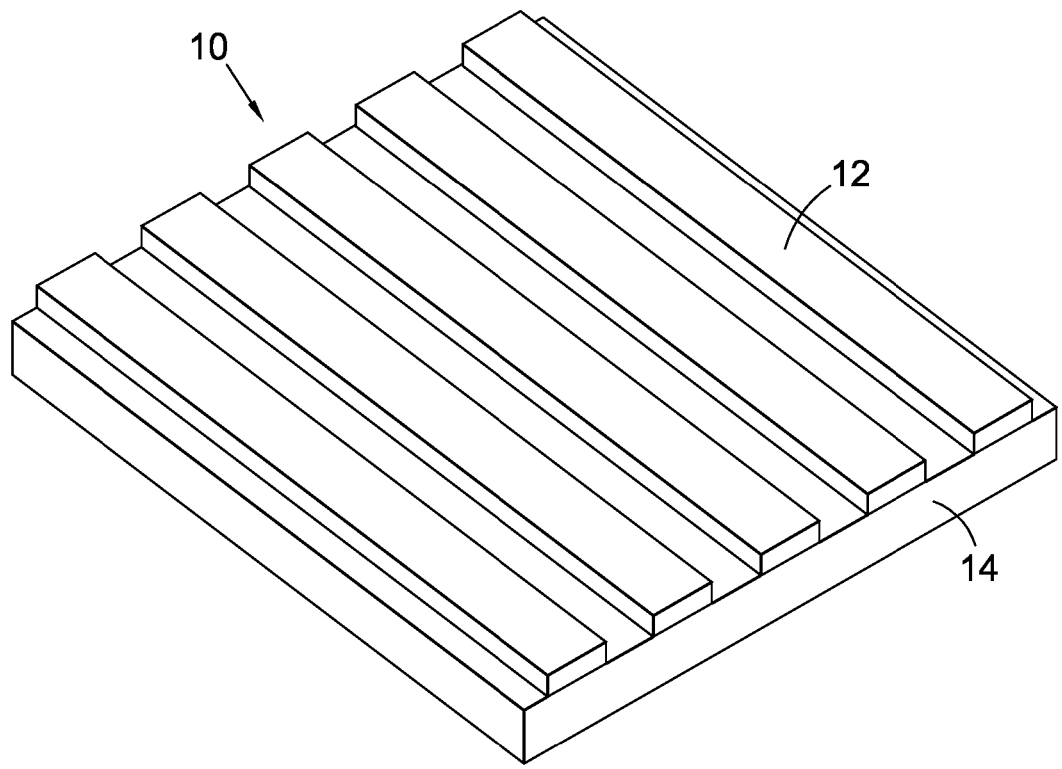
FIG. 1 is perspective view of an example of a regular grating.

FIG. 1 is a schematic illustration of an example for diffracting an electromagnetic wave/signal including a diffractive element, which in this example is in the form of a grating 10 e.g. for analysing the spectral components of an electromagnetic signal, e.g. of UV, visible, near-infrared light, or the like. Gratings may be configured to reflect light of different wavelengths at different angles, thus providing spatial separation of the spectral components. In some examples, the grating 10 may be configured to reflect light of a certain wavelength when a resonance condition is met. In particular, the grating 10 may exhibit or support a guided-mode resonance which allows for light of a certain wavelength to be reflected at a certain angle. Without wishing to be bound by theory, it is believed that the guided-mode resonance may occur when incident light is coupled into a guided mode in a grating element 12 of the grating 10, wherein constructive interference of the diffracted electromagnetic waves results in the light in the guided mode being directed or confined in the region of the grating 10 and reflected back towards the direction of the incident electromagnetic field. The electromagnetic field coupled into a guided-mode resonance may include an electromagnetic field distribution extending internally and externally of the grating element 12, and may be regarded as forming a standing wave within the region of the grating element 12. Thus, the optical properties e.g. refractive index, scattering properties, or the like, of the region outside the grating element 12 may influence the properties of the electromagnetic field distribution e.g. if there is a guided mode resonance. In some examples, the grating 10 may only exhibit a resonance for a specified wavelength for a specified refractive index of a medium in the vicinity of the grating 10. Further, the individual properties of the grating 10 (e.g. refractive index, grating periodicity, absorption properties, scattering properties, or the like) may influence or affect the wavelength and/or refractive index values, or indeed other optical parameters, which can result in a guided mode resonance being supported by the grating 10. Such gratings 10 may only support a single guided mode resonance for a given wavelength (e.g. for a given angle of incidence) and refractive index combination (e.g. the refractive index in the vicinity of the grating 10). It will be appreciated that any type of diffractive element such as a grating may be configured to support a guided mode resonance. Therefore, depending on the wavelength of operation, the material of the diffractive element may be selected according to required usage. For example, a metal-grating or a metal-coated grating (e.g. a diffractive element comprising any of copper, aluminium, gold, or the like) may be suited for use with some wavelengths. In some examples, a silicon-based grating (e.g. silicon nitride, or the like) may be suited for use with some wavelengths. Different materials may have different transparencies and/or different refractive indices for different wavelengths (and/or different angles of incidence). Therefore, the material of the diffractive element may be appropriately selected so as to enable a guided mode resonance to be coupled into, and supported by the diffractive element. In some examples of the present disclosure, there may at least one material of any appropriate type and/or any appropriate diffractive element configuration for supporting at least one guided mode resonance for any appropriate wavelength (and/or for any appropriate angle of incidence of illumination).

Typical gratings, such as the grating 10 illustrated by FIG. 1 include a set of periodically-repeating parallel elongated grating elements, which in this example are in the form of grating strips 16 which are each spaced apart by an equal distance. The parallel grating strips 16 extend out (e.g. upwardly) from the substrate 14 surface and include a constant height (e.g. defined in the same direction extending out from the substrate 14 surface (e.g. upwardly)). The parallel grating strips 16 each extend lengthwise in a grating strip direction that is parallel to the plane of the substrate 14 surface. The parallel grating strips 16 have a constant periodicity defined in a direction that is parallel to the plane of the substrate 14 surface, but which is also perpendicular to the grating strip direction. Furthermore, the parallel grating strips 16 each have a constant width (e.g. in the direction defined by the constant periodicity of the strips 16).

FIG. 2 is a graph of reflected resonance wavelength measured by a spectrometer for an example of the grating 10 including a (high refractive index) Silicon Nitride ($Si_3N_4$) grating element 12 supported on a silica substrate 14, wherein the grating 10 was exposed to different glucose concentrations at different times. The different glucose concentrations (indicated as a percentage: 0, 5, 10, 15, 20 & 25% on the graph) each have a different refractive index value, which in turn affects the wavelength of light supported by a guided mode resonance in the grating 10. In this example grating 10, the resonance wavelength is shifted from just above 840 nm to just above 844 nm for a change in glucose concentration from 0 to 25% over a period of time. The data illustrated by the graph underwent curve fitting to extract the resonance wavelength for each glucose concentration. By virtue of the average resonance shift indicated by the data, the measured sensitivity of the example grating 10 was 137 nm/RIU±3 nm/RIU (where RIU refers to a Refractive Index Unit). The unit nm/RIU may be regarded as being indicative of how much a resonant wavelength shifts for a unit change in refractive index. The sensitivity to refractive index changes may be regarded as a figure of merit for the performance of a resonant sensor.

Diffractive Element

Figure 3:
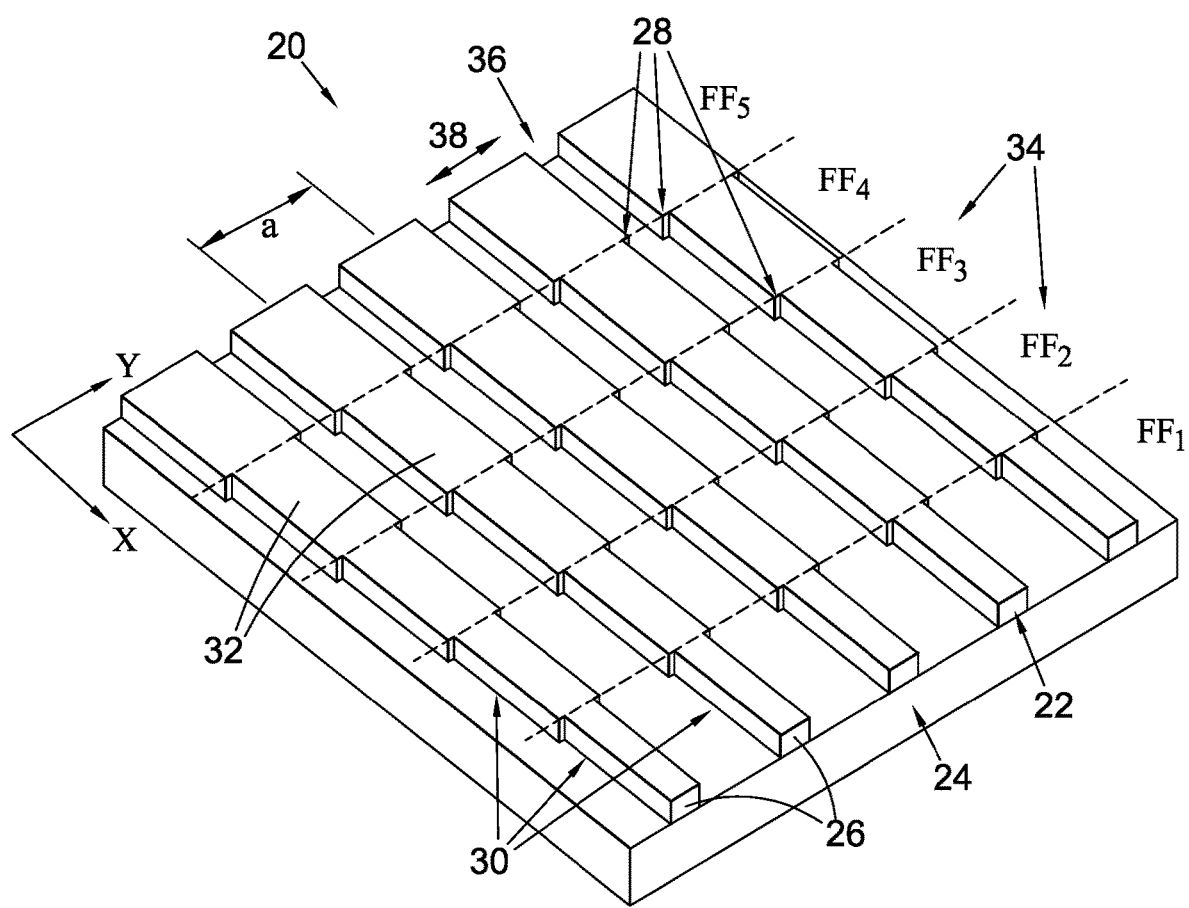
FIG. 3 is a perspective view of a diffractive element in accordance with an example of the present disclosure.

FIG. 3 illustrates a diffractive element 20 in accordance with an example of the present disclosure. The diffractive element 20 in this example includes a grating 22 comprising silicon nitride ($Si_3N_4$), which is a relatively high refractive index material. However, it will be appreciated that the diffractive element 20 could comprise or be formed from any other suitable material or materials other than silicon nitride. The grating 22 is supported on a grating substrate 24, which in this example comprises silica. In the present example the grating 22 includes a plurality of grating elements, which in this example include elongated grating elements in the form of periodically-repeating parallel grating strips 26 (or ribs 26), wherein the periodicity of the strips 26 is denoted by displacement "a" in FIG. 3. The periodicity of the diffractive element 20 (e.g. grating 22) may be set according to a predetermined centre wavelength of a source of an electromagnetic field. Therefore, any modification or adaptation (e.g. chirping, or the like) of the grating 22 may provide for operation at or near the centre wavelength.

The diffractive element 20 (e.g. grating 22) is configured to support a plurality of guided mode resonances. In the present example, the grating elements (e.g. strips 26) are profiled, shaped, or the like to support the plurality of guided mode resonances. Grating elements which include at least one portion (e.g. a grating portion) having a different dimension, shape, profile, or the like compared with at least one other portion (e.g. a grating portion) of the grating element may support the plurality of guided mode resonances. For example, each of the portions of the grating elements having a different dimension, shape, profile, or the like may only support a guided mode resonance when a certain condition is met. For example, when an incident electromagnetic field includes a certain wavelength (e.g. within a predetermined wavelength range), and a medium in the vicinity of the diffractive element 20 has a certain refractive index (e.g. within a predetermined wavelength range), a guided mode resonance may or may not only be exhibited in one or more portions (e.g. a section) of the diffractive element 20 including one or more grating elements having a certain dimension, shape, profile, or the like. Optionally, in some examples, different portions or sections of the diffractive element 20 may be configured to exhibit at least one, for example different, guided mode resonance responsive to different wavelength and/or refractive index combinations, or the like. In some examples, at least one portion or section of the diffractive element 20 may be configured to accommodate one or more angle of incidences, e.g. of an incident electromagnetic signal, for example, so as to support at least one guided mode resonance.

Thus, the diffractive element 20 may include at least one section (e.g. an area of the diffractive element 20) configured to support at least one of the plurality of guided mode resonances. Where there is a plurality of sections (e.g. area), the diffractive element 20 may be segregated, divided, partitioned, or the like into separate (e.g. segregated, divided, partitioned, or the like) sections (e.g. areas) of the diffractive element 20. Therefore, by configuring the diffractive element 20 to support a certain guided mode resonance in one of the sections, which may be a section or area of the diffractive element 20, when a guided mode resonance is exhibited (e.g. excited) in the diffractive element 20, it may be possible to identify at least one parameter associated with the exhibited guided mode resonance. For example, if a section or area of the diffractive element 20 reflects an incident electromagnetic field (e.g. by coupling an incident field into the guided mode resonance of the section or area), that section or area may be identified (e.g. by detecting, imaging, or the like), thus potentially indicating that a medium in the vicinity of the diffractive element 20 (e.g. and/or that the medium in the vicinity of the section or area) includes a certain refractive index (e.g. within a predetermined range) and/or that an incident electromagnetic field includes a certain wavelength (e.g. within a predetermined range). In some examples, such an arrangement may be useful for identifying when the refractive index of a medium in contact with or in the vicinity of the diffractive element 20 is within a predetermined range (e.g. for an electromagnetic field including a wavelength within a predetermined range). In some examples, the medium may or may not be in contact with at least a portion of the diffractive element 20, for example, the medium may be in the vicinity of the diffractive element 20. In such examples, the electromagnetic field distribution may be such that at least part of the field extends at least partially into the medium. In this case, the medium may support or help to support a guided mode resonance in at least a part (e.g. at least one section) of the diffractive element 20. Thus, in some examples, providing the medium is in the vicinity of at least part of the diffractive element 20, it may be possible for a guided mode resonance to be supported at least by virtue of the medium having a refractive index (or other appropriate optical parameter) within a predetermined range.

In the present example, the diffractive element 20 may be considered to be chirped. For example, the wavelength and/or refractive index (or the like) sensitivity of the diffractive element 20 may provide support for a plurality of guided mode resonances such that a plurality of different wavelength and/or refractive index values may support the plurality of guided mode resonances.

In some examples where the diffractive element 20 is chirped, the chirping may be achieved in any appropriate way. In the example of FIG. 3 the chirping is achieved by providing grating strips 26 which are profiled, shaped, or the like to support the plurality of guided mode resonances. The grating strips 26 include a profile which varies in dimension along the grating strips 26. In this example, the grating strips 26 include a width which varies along the length of the grating strips 26 such that the space (e.g. the width) between adjacent grating strips 26 also varies. In this example the width of the grating strips 26 varies by having a stepped profile, wherein the width abruptly changes at certain points along the length of the strips 26. The example includes strips 26 including a stepped profile 28 along the side walls 30 of the strips 26. The stepped profiles 28 on either side of each strip 26 are aligned such that the abrupt changes in strip width occur at regular and aligned intervals (i.e. with respect to the stepped profile 28 of the other strips) along the length of the strips 26. In the present example the width of the strips 26 decreases in discrete intervals along the length of the strips 26, wherein each of the intervals in this example includes a cuboid-shaped portion of the strip 26 (e.g. each of the strips 26 of FIG. 3 may be considered to include a plurality of cuboid-shaped portions 32 which vary (e.g. decrease or increase) in width along the length of the strip 26). In this example, the depth (e.g. the height) of the grating strips 26 is constant along the length of the grating strips 26.

As mentioned previously the diffractive element 20 can support a plurality of guided mode resonances. In the example of FIG. 3, the strips 26 are aligned to support the guided mode resonances at regular intervals along the length of the strips 26. In particular, each of the strips 26 are aligned parallel to each other with a constant periodicity, and the stepped profiles 28 of adjacent strips 26 are also aligned such that the width of each of the strips 26 in a direction (e.g. direction "Y" in FIG. 3) that is perpendicular to the strips 26 (e.g. direction "X" in FIG. 3) is equal or substantially/approximately equal. A particular guided mode resonance may be supported in a part of the diffractive element 20 including equal or substantially/approximately equal width strips 26. Thus, the diffractive element 20 may be divided into sections 34 supporting a particular guided mode resonance (for a given combination of wavelength, refractive index, and/or the like). In the example of FIG. 3, the diffractive element 20 includes sections 34, which in this example are in the form of rows (in direction Y) of equal or substantially equal width (in direction Y) portions of grating strips 26 which are spaced apart by an equal or substantially equal spacing width 36 between adjacent grating strips 26.

The geometry of the example of FIG. 3 may allow guided mode resonances to be exhibited in the sections 34. Since the stepped profiles 28 of the strips 26 are aligned to provide a substantially constant/equal width of the strips 26 in e.g. the "Y" direction, the guided mode resonances exhibited by the diffractive element 20 may extend substantially in e.g. the "Y" direction also for a certain wavelength and refractive index combination. If the resonance condition changes (e.g. for a change in refractive index) the position of the guided mode resonance may shift along the length of the strips 26 such that the exhibited resonance still substantially extend in e.g. the "Y" direction but is displaced in terms of e.g. the "X" direction. Therefore, an exhibited guided mode resonance may extend in a direction perpendicular to the strip 26 direction, but when an optical parameter (e.g. wavelength, refractive index, or the like) or other relevant parameter (such as temperature, or the like) changes, the position of the guided mode resonance may be shifted (along the strip 26) such that the guided mode resonance becomes centred at a different position (e.g. in X) along the strips 26.

As best illustrated by the example of FIG. 3, the ratio between a grating strip width 38 and the spacing width 36 may define a fill-factor ("FF") of at least a portion of the diffractive element 20. A larger ratio may indicate a relatively wider grating strip width 38 to spacing width 36, whereas a smaller ratio may indicate relatively narrower grating strip width 38 to spacing width 36. The example of FIG. 3 includes sections 34, each of which includes a row of portions of parallel spaced-apart grating strips 26 of equal width 38 (and equal spacing width 36 therebetween). Each of these rows is partitioned by dashed lines on FIG. 3, wherein the fill-factor "FF" of each of the rows increases from the section 34 having the smallest fill-factor $FF_1$, through to the section 34 having the largest fill-factor $FF_5$. Varying the fill-factor (which may be considered representative of varying grating strip width 38 to the spacing width 36 ratio) may chirp the diffractive element 20. Due to the multiple rows of portions (e.g. the sections 34) of grating strips 26 having different fill-factors the diffractive element 20 of the example of FIG. 3 may support a plurality of guided mode resonances (and may thus be considered to be chirped). In the example of FIG. 3, there are five different sections 34 having five different fill-factors and may support five different guided mode resonances. It will be appreciated that the diffractive element 20 may include more than or fewer than five sections 34. The example of FIG. 3 may thus only represent part of a diffractive element 20.

It will be appreciated that any dimension of the strips 26 could be varied in any appropriate manner, for example, the dimension (e.g. width and/or height) could be varied continuously along length of the strip; e.g. the dimension could include a tapered profile or shape. In other examples, the dimension could be varied in discrete intervals such that at least some of the discrete portions include abrupt transitions (e.g. similar to the example of FIG. 3). In some examples, at least one of the side walls or edges of the strips could include at least one of: a straight portion, a tapered portion, a stepped portion, or the like. In some examples, there may be any combination or variation of ways to vary the dimensions of the strips.

In other examples the chirping may be provided by varying at least one parameter of the diffractive element 20. In examples where the diffractive element 20 is in the form of a grating, at least one grating parameter may be varied. In some examples, the grating may include a grating element periodicity which varies, for example, by providing a non-constant spacing between adjacent grating elements (e.g. grating strips), and/or by providing a plurality of grating elements organised into sections of constant grating element periodicity but at least one section having a different grating element periodicity, or the like. In some examples the chirping may be achieved by varying the dimension/size of the space between adjacent grating elements (e.g. grating strips) and/or by varying at least one dimension/shape/profile of the grating elements (e.g. grating strips).

Figure 4:
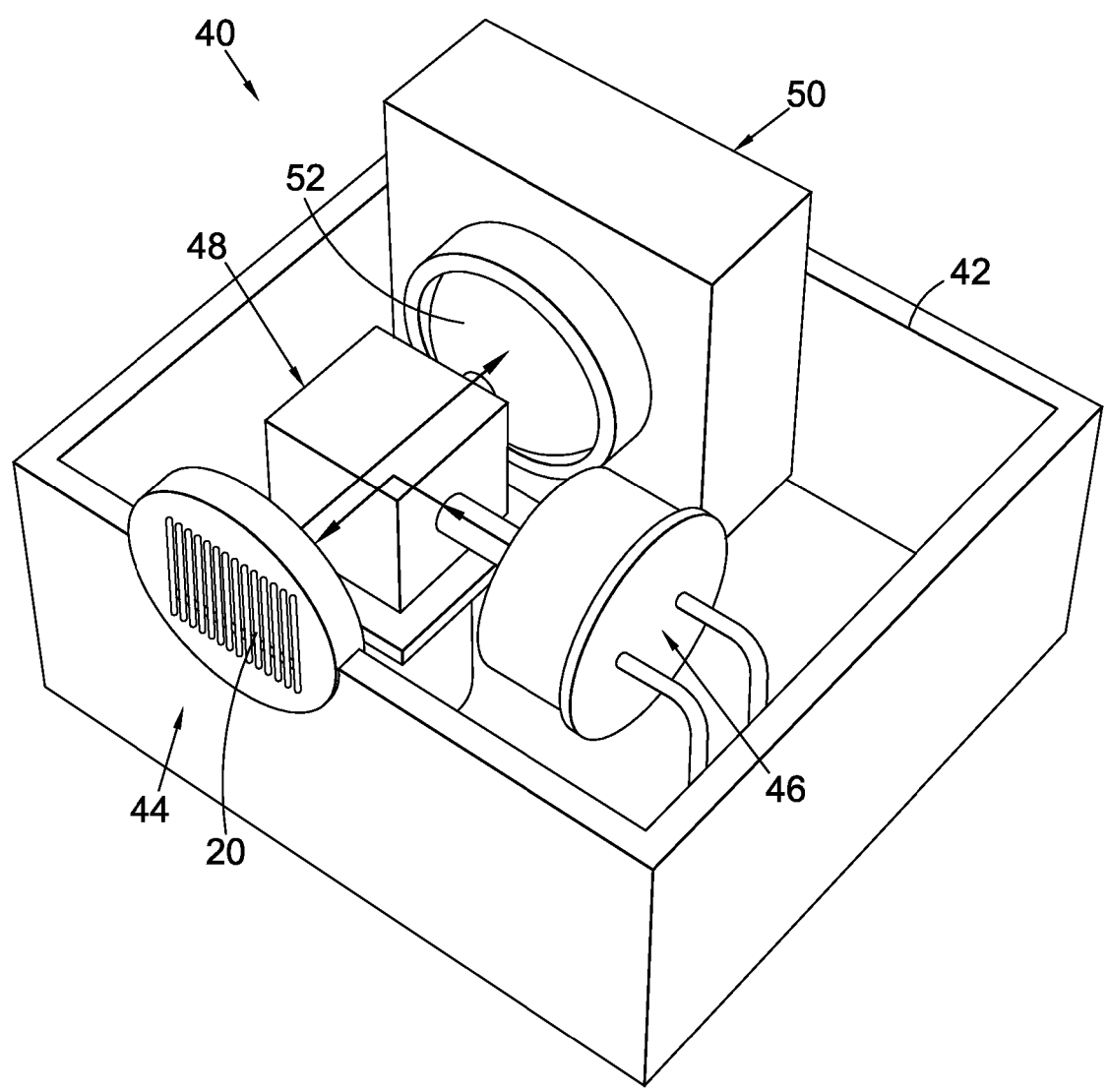
FIG. 4 is a perspective view of a sensor apparatus incorporating an example of a diffractive element in accordance with the present disclosure.

FIG. 4 illustrates an example sensor apparatus 40 including a diffractive element 20 in accordance with an example of the present disclosure. The sensor apparatus 40 includes a housing 42 for supporting the diffractive element 20. The diffractive element 20 is mounted in a housing wall 44. The grating 22 is oriented to be provided facing outwardly of the housing 42. The grating substrate 24 is supported by the housing wall 44. The interior of the housing 42 includes an illuminator 46, which in this example is in the form of a laser diode, for example a Vertical Cavity Surface Emitting Laser (VCSEL), or the like. It will be appreciated that any appropriate illuminator 46 may be used, e.g. any type of laser (for example a semiconductor-based laser diode such as double hetero-structure, quantum well, distributed Bragg reflector, distributed feedback, edge-emitting diodes, or the like; a solid-state diode pumped laser; or the like), any type of light-emitting diode (LED), or the like. A possible advantage of using an electrically pumped diode is that the sensor apparatus 40 may be relatively compact.

The illuminator 46 is mounted in the housing 42 in any appropriate way. The illuminator 46 is oriented such that the electromagnetic field (e.g. a collimated light beam) from the illuminator 46 follows a first path (e.g. an illumination path), is reflected at approximately 90 degrees by a beam splitter 48, which is also suitably mounted in the housing 42, to the diffractive element 20. In the present example the incident electromagnetic field is at normal incidence to the diffractive element 20 (wherein the plane of the grating 22 is perpendicular to beam direction). If the incident electromagnetic field is coupled into a guided mode resonance of the diffractive element 20, at least a portion of the field is reflected back (e.g. at normal reflectance) towards the beam splitter 48. At least a portion of the reflected field is transmitted by the beam splitter 48 and arrives at a detector 50, which in this example is in the form of a focusing element 52 (e.g. a lens, or the like) and an image sensor (not shown), such as a Charged Coupled Device (CCD), Complementary Metal Oxide Semiconductor (CMOS) device, or the like. In the present example the focusing element 52 images the grating 22 onto the image sensor. Thus, any part of the grating 22 exhibiting a guided mode resonance can be imaged by the image sensor. The focusing element 52 and image sensor may also be mounted to the housing 42 in any appropriate manner. The optical arrangement of the present example may be relatively simple to align and relatively distortion/aberration-free. Although it is possible to provide a sensor apparatus 40 in accordance with the present disclosure including optical components operating away from normal incidence/reflectance relative to the grating 22, it may be simpler and more compact to operate at normal incidence/reflectance relative to the grating 22. Mass manufacturing of the sensor apparatus 40 may be simpler, less expensive, or the like, if the components can be aligned to operate under the condition of normal incidence/reflectance of the electromagnetic field.

Due to the relatively simple geometric arrangement of the optical components supported in/by the housing 42, the housing 42 may be relatively compact. Reducing the size of the housing 42 may make the sensor apparatus 40 easier to transport, thereby potentially increasing the ease of providing/using/the applicability of the apparatus 34 in the field. It will however be appreciated that any appropriate optical arrangement may be provided, which may provide for operation at, near or away from normal incidence (e.g. with respect to the grating 22). The housing 42 may be relatively rugged, waterproof, and/or the like so that the sensor apparatus 40 can be used in the field or in wider clinical practice. The housing 42 may protect the internal components of the sensor apparatus 40 from damage such as caused by external impacts, or the like. Further the mounting for the internal components may hold the internal components in place if the sensor apparatus 40 is subjected to an external shock or load. The sensor apparatus 40 may include any appropriate connection (e.g. wireless or wired) to communicate data to/from the apparatus 34. The apparatus 34 may include an inbuilt power source (not shown) such as a battery or the like. The apparatus 34 may include any processor and/or memory for providing computational functionality.

An example way to reduce the number components required for simple operation of the apparatus 34 is to use a spectrally narrow/narrowband/single-wavelength illumination source. Due to the diffractive element 20 being chirped, the sections 34 may exhibit a guided mode resonance which is or may be position-dependent for the spectrally narrow/narrowband/single-wavelength electromagnetic signal at a given refractive index. Therefore, there may be no requirement for a spectrometer to be provided to detect a guided mode resonance (which would otherwise increase the complexity of the optical arrangement). However, for a spectrally broader/broadband/multiple-wavelength illumination source, there may be multiple guided mode resonances simultaneously exhibited by the diffractive element 20 for a given refractive index. In some examples of the present disclosure, it may be appropriate to include a spectral filter or spectrometer for discriminating between guided mode resonances for different wavelengths produced by such a spectrally broader/broadband/multiple-wavelength illumination source. However, the spectrally narrow/narrowband/single-wavelength illumination source may be relatively simpler and may require fewer components to provide sufficient sensitivity or resolution for detecting a guided mode resonance.

In some examples, there may be some laser speckle caused by nature of the illuminator 40 (e.g. where in the form of a coherence light source such as a narrowband laser). In such examples, the speckle may reduce the signal-to-noise ratio of the imaged the guided mode resonances. To reduce the speckle, a rotating diffuser (not shown) may be employed to decrease the speckling. Any appropriate method may be used to reduce speckling, for example, by using a pulsed source, or the like. In some examples, there may be no requirement to reduce speckling, for example due there being sufficient signal-to-noise ratio.

Figure 5A:
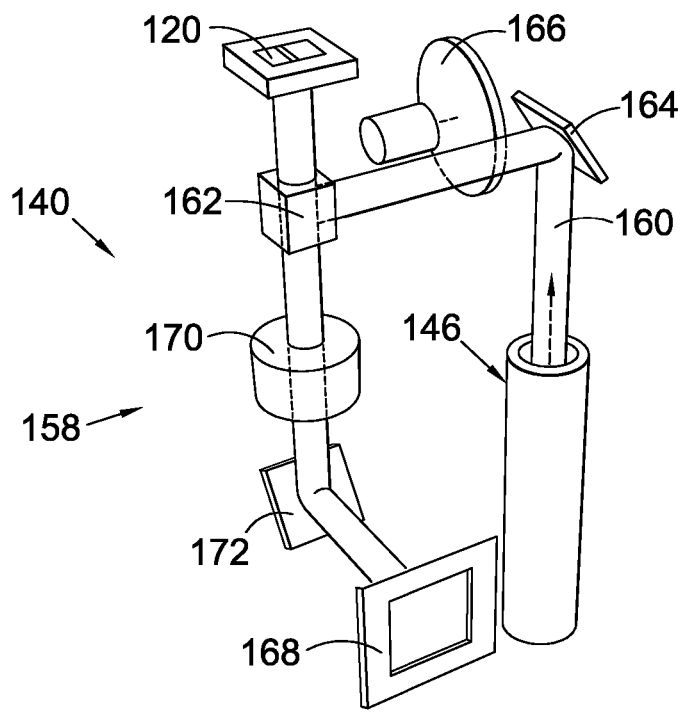
FIGS. 5a-5b respectively illustrate a perspective schematic view of an optical path of a sensor apparatus according to an example of the present disclosure and a perspective view of a housing for optical elements providing the optical path of the sensor apparatus.
Figure 5B:
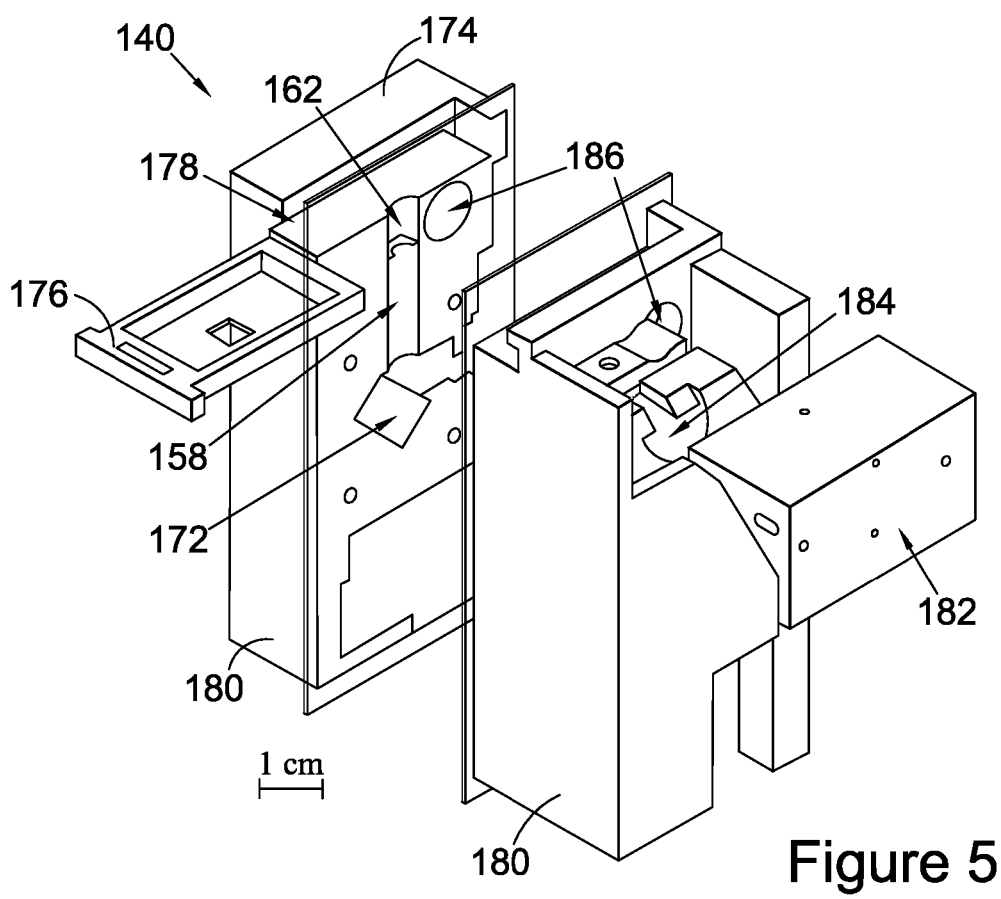

FIGS. 5a-5b illustrate part of an example of a sensor apparatus 140 incorporating a diffractive element similar to the diffractive element 20 used in FIG. 4. Reference numerals for features that are the same as or similar to the sensor apparatus 40 illustrated by FIG. 4 have been incremented by 100 where appropriate. Further features of the sensor apparatus 140 are described in more detail below.

Referring initially to FIG. 5a, there is shown a number of optical elements 158 of the sensor apparatus 140. A laser, which in this example is in the form of a vertical cavity surface emitting laser (VCSEL) 146 operating at 854 nm (VCSEL, Thorlabs CPS850V), is used to produce an optical beam 160 that is directed towards a beam splitter 162 by an adjustable mirror 164. A rotatable diffuser 166, which in this example is in the form of a plastic film, for reducing laser speckle is disposed between the mirror 164 and the beam splitter 162. The beam splitter 162 reflects the optical beam 160 towards a diffractive element 120. The adjustable mirror 164 permits fine-tuning of the angle of incidence of the optical beam 160 on to the diffractive element 120. A signal from the resonance in the diffractive element 120 is reflected towards the beam splitter 162, and directed towards a camera sensor 168 via imaging optics 170 and an imaging mirror 172.

With reference to FIG. 5b, a housing 174 for holding the optical elements 158 of the sensor apparatus 140 in place is illustrated. In this example, the housing 174 is fabricated by 3D-printing and includes a chip cartridge 176 (for supporting the diffractive element 120 in the housing 174 and including an aperture 177 for allowing the diffractive element 120 to be illuminated by the optical beam 160) that is configured to be supported in the housing 174 (e.g. by sliding into a corresponding slot 178 in the housing 174). The housing 174 is in the form of two mould parts 180 that are connected together (e.g. by glue, screws, or the like) to enclosed the optical path and optical elements 158 illustrated by FIG. 5a. The housing 174 includes an adjustable mirror module 182 that is externally adjustable for moving the adjustable mirror 164. FIG. 5b also illustrates the position of some of the optical elements 158 such as the imaging mirror 172, a beam path opening 184 in the housing 174 for permitting the optical beam 160 to be reflected from the adjustable mirror 164, the beam splitter 162 and a diffuser motor 186 operable to rotate the rotatable diffuser 166. The housing 174 is compact and provides appropriate support for the optical elements 158.

Figure 6A:
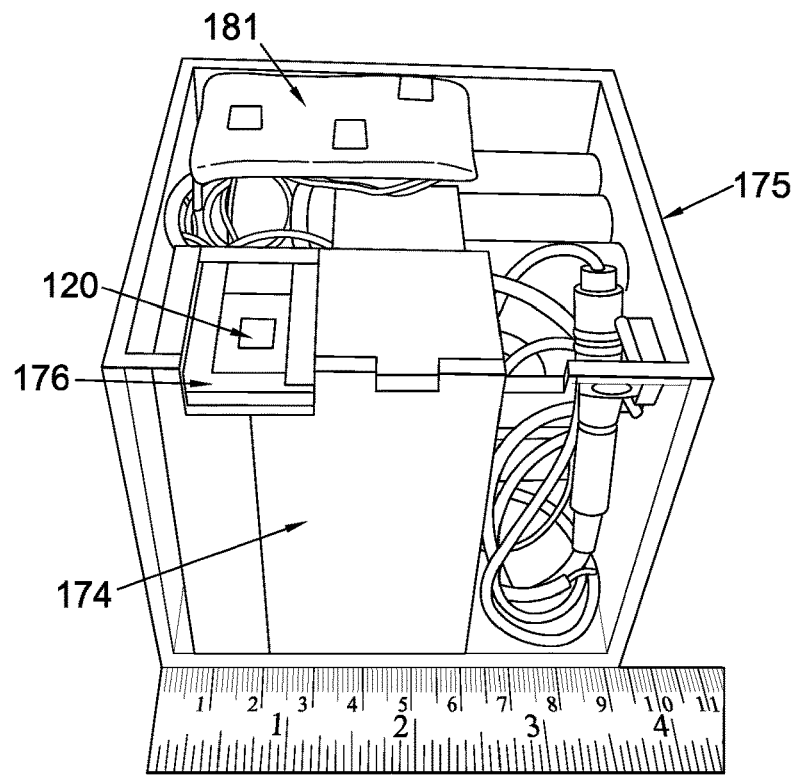
FIGS. 6a-6b respectively show photographic images from a perspective and an elevated view of a sensor system including the sensor apparatus of FIGS. 5a-5b.
Figure 6B:
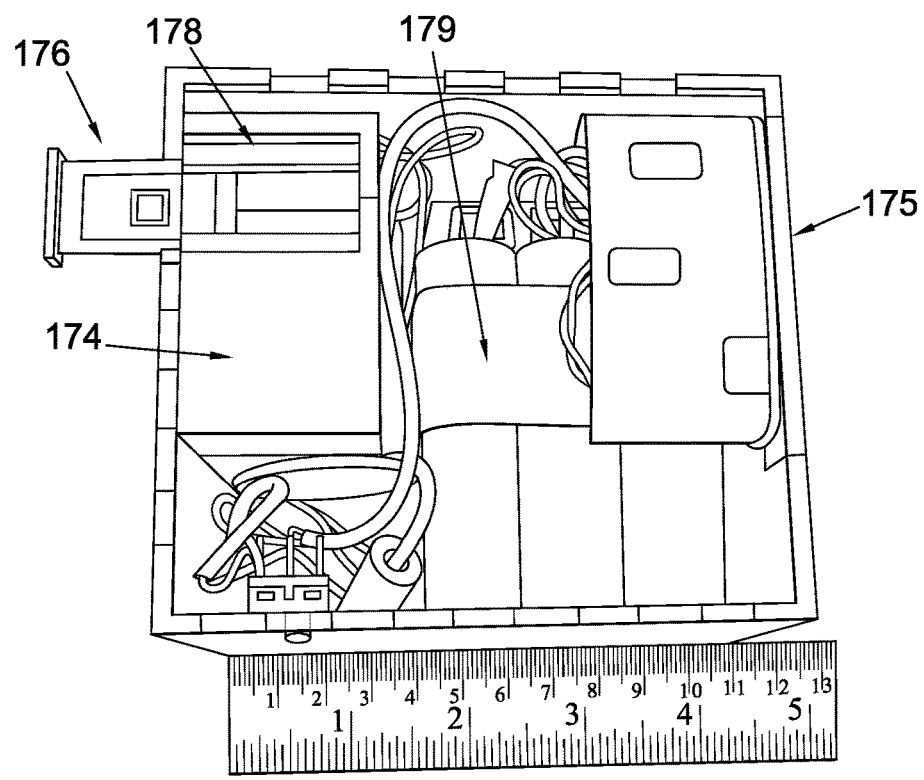

Optionally, and with reference to FIGS. 6a-6b, the housing 174 can be encased in a package 175 that is rugged, waterproof (if required) and includes additional components such as a battery 179 for powering the sensor apparatus 140. The package 175 may be fluid-tight e.g. for use in an aqueous environment and/or in an environmental sensing application. The package 175 is adapted to permit external access to the slot 178 for inserting the chip cartridge 176. The package 175 also includes a computer 181, which in this example is in the form of a micro-PC such as a Raspberry Pi 3 microcomputer. The computer 181 is operable to receive images from the camera sensor 168 for processing in situ or for storage on a memory for processing after collecting data. The power for at least the computer 181, the laser 146 and the rotatable diffuser 166 is provided by the battery 179. The dimensions of the package 175 illustrated by FIGS. 6a-6b is 10×11×7 cm; however it will be appreciated that any package size is possible subject to the arrangement of the optical elements and/or any other components encased by the package.

FIG. 7 is a schematic illustration comparing a guided mode resonance exhibited by the diffractive element 20 for two different refractive indices, "$n_1$" and "$n_2$" (the upper part of the illustration showing a guided mode resonance 54 exhibited when the diffractive element 20 is illuminated when in the presence of a medium having a first refractive index "$n_1$"; the lower part of the illustration showing a guided mode resonance 54 exhibited when the same diffractive element 20 is illuminated when in the presence of a medium having a refractive index "$n_2$"). For a constant wavelength electromagnetic signal illuminating the diffractive element 20, the change of refractive index causes a change in the section 34 in which the guided mode resonance 54 is exhibited (i.e. the guided mode resonance is exhibited at a different position of the diffractive element 20 for different refractive indices). An expanded elevated view of the diffractive element 20 in the right hand corner of FIG. 7 illustrates adjacent sections 34, each section 34 including a plurality of parallel spaced grating strips 26 of differing widths (and illustrating the stepped profile 28). The schematic illustration of FIG. 7 includes similar features to those of the example diffractive element 20 illustrated by FIG. 3, wherein the sections 34 are provided in an array extending in the direction X of the diffractive element 20.

Figure 8:
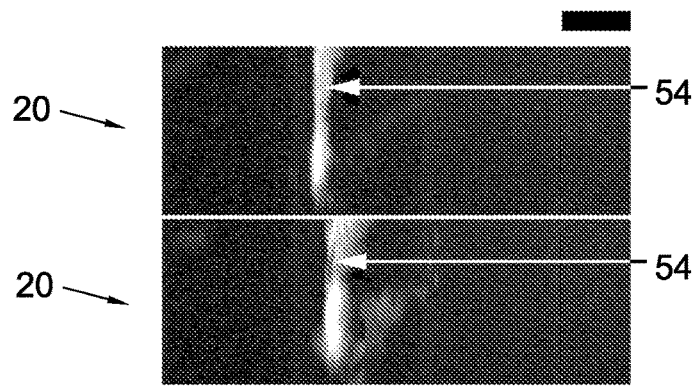
FIG. 8 is an experimental image of a shift in resonance position exhibited within an example of a diffractive element in accordance with the present disclosure.

FIG. 8 is an image of an experimental measurement of the shift in position of a guided mode resonance 54 exhibited by the diffractive element 20 for a change in refractive index $\Delta n=2.4\times 10^{-3}$, wherein the scale bar at the top right side of FIG. 8 represents 100 μm along the diffractive element 20. Thus, it can be seen for a relatively small change in refractive index there may be an immediately identifiable shift in the position of an exhibited guided mode resonance 54.

FIG. 9 is a resonance wavelength "map" of the diffractive element 20 wherein the surrounding medium is water (thus having a refractive index at visible wavelengths of about 1.3). By employing a tuneable monochromatic source and varying the wavelength of an incident monochromatic light source, the spectral map of FIG. 9 is obtained. The resonance wavelength $\lambda_R$ for a given position along the diffractive element 20 is obtained as shown in FIG. 9. Thus, employing a spectrally tuneable source of illumination may be an alternative option for determining the refractive index of the medium surrounding the diffractive element 20, but this option may require further instrumentation than might otherwise be required for a single wavelength/monochromatic/narrowband source of illumination (such as has been discussed herein). FIG. 9 demonstrates that the guided mode resonance is sensitive to wavelength of the incident electromagnetic field. Thus, where a target refractive index needs to be identified by a user, the wavelength may be selected or varied to confirm the presence of a medium of the target refractive index. Alternatively or in addition, the user may employ a larger bandwidth spectral source which may excite multiple guided mode resonances within the diffractive element 20 when a target refractive index has been identified. Any appropriate methodology may be employed whether using a single-wavelength/narrowband/variable-wavelength/broadband or other source of illumination.

Fabrication of the Diffractive Element 20

In some examples the diffractive element 20 may be fabricated to include or be in the form of a chirped grating. Initially, a 150 nm thick silicon nitride ($Si_3N_4$) layer may be provided on a silica substrate. In this example the grating has a grating periodicity "a"=560 nm and an approximate filling factor "FF"=0.70. In the present example these dimensions were determined using rigorous coupled-wave analysis (RCWA) simulations. Using an electron beam lithography system (in this example by Raith Voyager), a pattern was exposed in a spin-coated layer of resist (in this example by AllResist ARP-9), before being developed in Xylene to dissolve the exposed regions. Subsequently, the pattern was transferred into the silicon nitride layer by reactive ion etching (RIE), using a mixture of $CHF_3$ and $O_2$ gases. Finally, the remaining resist was removed by gentle sonication in 1165 solvent. It will however be appreciated that any particular aspect, example or feature of the fabrication process may be changed, replaced or modified to manufacture an appropriate diffractive element 20.

Sensor Apparatus 40 Construction and Experimental Optical Arrangement

For the light source used in the experiments as indicated by FIGS. 7 to 12, a VCSEL (Thorlabs CPS850V) or a supercontinuum laser (Leukos SM30) in combination with a monochromator was employed. In order to remove laser speckle from the source, a rotating diffuser was used (although this may or may not be required depending on the set-up). The detector 50 (e.g. a camera in this example) used for the experiments was a CoolSnap Myo (Photometrics). In some examples an on-board computation module (not shown) (e.g. a Raspberry Pi, Arduino, or the like) may be provided, and which may be powered by an on-board energy source (e.g. a battery, or the like). The on-board computation module may be configured for providing remote operation (which may be useful for mounting the apparatus 34 on a movable apparatus such as a robot, or the like, for investigating and analysing samples in hazardous and/or confined areas). The on-board computation module may be connected to the detector 50 and/or illuminator 46, and any other components, for data acquisition and/or for control purposes, or the like.

Bulk Sensitivity Measurements Using Glucose Solutions

FIGS. 10*a*-10*b* illustrate results from further experiments measuring the shift in the guided mode resonance position exhibited by the diffractive element 20. In this example the medium in the vicinity of the diffractive element 20 was a glucose solution. Different glucose concentrations in a medium (e.g. water) have different refractive indices.

Although not illustrated in this disclosure, a microfluidic chamber was bonded to the sensor apparatus 40 such that fluid in the chamber is provided at or near a surface of the diffractive element 20 (e.g. such that the fluid may be in contact with the grating 22). Since the guided mode resonance signal is reflected from the diffractive element 20, the region externally of the diffractive element 20 may be relatively unrestricted and may be interfaced with any type of flow channel or fluid delivery system, or the diffractive element 20 could be left exposed to the environment if desired for a given application. Thus, the sensor apparatus 40 may be relatively flexible in terms of being used for testing and/or diagnosis applications.

In the present example, the microfluidic chamber was constructed using PDMS elastomer (poly dimethylsiloxane), prepared at a ratio of 1 part curing agent to 10 parts silicone base. The chamber was cured overnight at 60 degrees C., and was bonded to the diffractive element 20 using uncured PDMS as an adhesive. The chamber included a volume of 40 µL, and included inlet/outlet tubes positioned on either side of the sensing region of the sensor apparatus 40. In the present example, the chamber outlet tubes were connected to a syringe pump to pull fluid through the chamber at a flow rate of 30 µL/min for the glucose sensitivity experiments and 2 µL/min for the IgG binding experiments.

In the experiments, the performance of the diffractive element 20 was determined by flowing a series of glucose solutions into the microfluidic chamber whilst imaging the position of the guided mode resonance on the diffractive element 20. By changing the concentration of dissolved glucose in the solvent, the refractive index can be controlled accurately. In the present example, the diffractive element 20 was exposed to a range of concentrations from 0% to 10% w/v in steps of 1%. This change in concentration corresponds to a refractive index range of 1.3324 to 1.344425 in steps of $1.2 \times 10^{-3}$ RIU.

Figure 12:
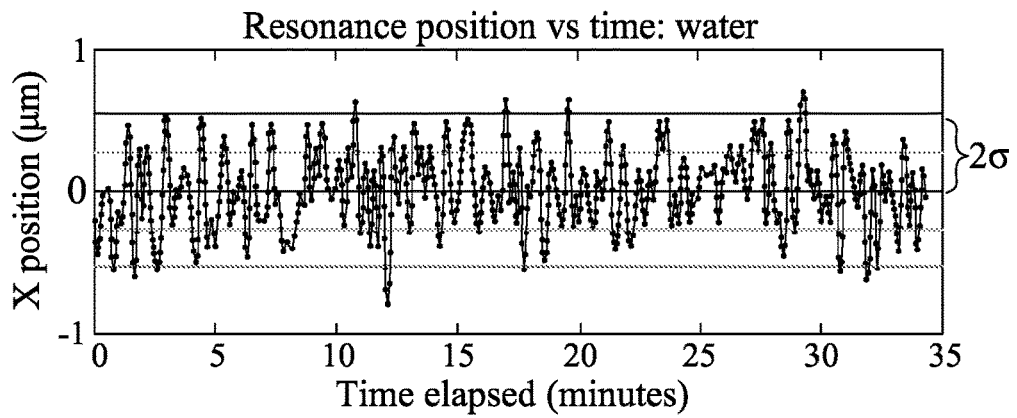
FIG. 12 is a graph of guided mode resonance position vs time for water sensed by an example diffractive element in accordance with the present disclosure.
Figure 13A:
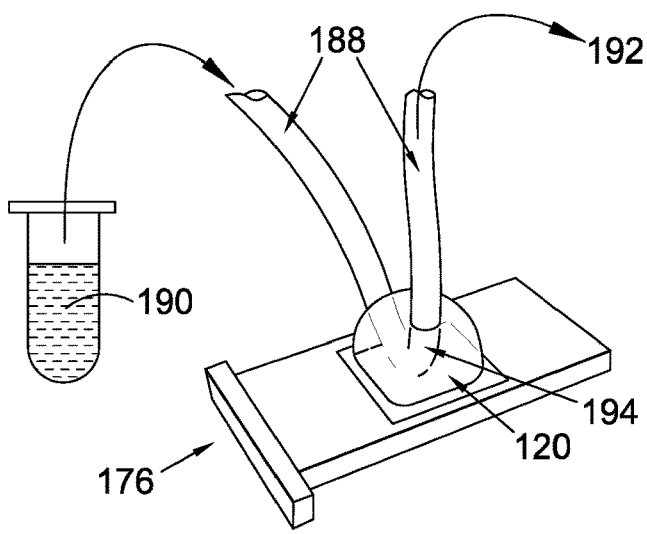
FIGS. 13a-13e respectively show a schematic illustration of a cartridge unit including an example diffractive element in accordance with the present disclosure; a camera image of a resonance position reflected by the diffractive element; a graph of average pixel intensity recorded by the camera against position on the diffractive element; a graph of resonance position vs. time for different glucose solutions applied to the diffractive element; and a graph showing change in position of the resonance over ~15 minutes of the curve shown in FIG. 13d.

After obtaining the images as illustrated by FIG. 10*a*, the pixel intensity profile was measured across the resonant strip (as illustrated by FIG. 10*b*). The peak position (in X) of the guided mode resonance was monitored over time, as shown in FIG. 11 for the different glucose solutions. The average positional shift per RIU was measured to be 3469 µm/RIU. This value may not be directly comparable to a conventional nm/RIU sensitivity since in the present example a position is measured instead of a resonance wavelength; indeed the resonance wavelength remains fixed so the conventional figure of merit may be regarded as being inappropriate. Nevertheless, in the wavelength shift from a non-chirped resonant grating of a similar structure was measured, in response to various glucose solutions. In the case of the non-chirped resonant grating, a sensitivity of 137 nm/RIU was obtained. Without wishing to be bound by estimates, it is estimated that the smallest measurable shift to be 2 times the standard deviation(s) in position for 0% glucose (i.e. the solvent being water). This shift was measured over ~35 minutes to be 0.547 µm (as illustrated by FIG. 12 which shows the deviation in X-position of the guided mode resonance as a function of time for a constant wavelength). Dividing this shift by the average positional sensitivity (3469 µm/RIU) gives a limit-of-detection (LOD) of $1.58 \times 10^{-4}$ RIU. This value may be regarded as being sufficient for detecting clinically relevant concentrations of biomolecules, as discussed herein, but this figure could be further improved towards values of LOD=$10^{-5}$ by using a finer dose variation across the grating FIG. 13*a* illustrates a chip cartridge 176 such as illustrated by FIGS. 5*a*-5*b*. The chip cartridge 176 includes the diffractive element 120 and a channel 188, which in this example is in the form of Tygon inlet and outlet tubes, for delivering fluid such as analyte from a fluid reservoir 190 and removing fluid from the diffractive element 120 to a syringe pump (not shown but indicated by arrow 192) for moving fluid through the channel 188. To deliver the fluid to the sensor apparatus 140, a microfluidic chamber 194 made from flexible elastomer (e.g. PDMS, or the like) is provided over the diffractive element 120.

With reference to FIGS. 5*a*-5*b*, it will be noted that the diffractive element 120 is operable to reflect the optical beam 160 so that the region above the diffractive element 120 is unobstructed and so any type of fluid delivery method can be used, such as paper fluidics or capillaries, or it could be left exposed, for example to a fluidic channel, if that was desired for the specific application.

Figure 13B:
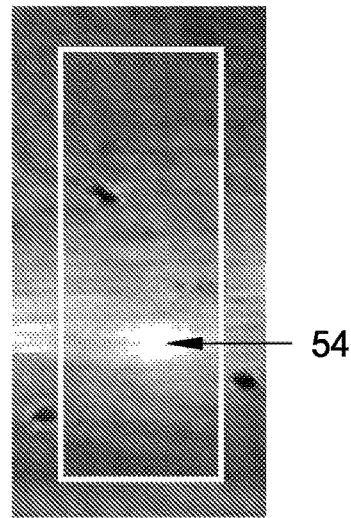
Figure 13C:
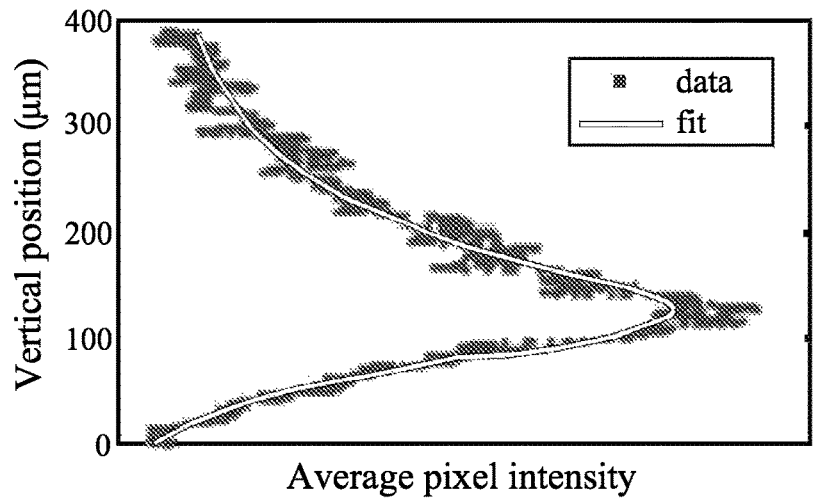

FIG. 13*b* is an image captured by the camera sensor 168, which in this example is imaging a resonance 54 in the form of a strip. FIG. 13*c* shows the pixel intensity (data) and average pixel intensity from the camera sensor 168 as a function of vertical position (in µm) along the camera sensor 168, which has also been averaged horizontally across the pixels of the camera sensor 168. It will be appreciated that the absolute position of the resonance 54 is not relevant in this example, as the sensing information is only contained in the relative shift of the stripe, so the sensor system 140 is considered to be alignment-tolerant. The average pixel intensity line is a fitted Fano curve. The peak position of the fitted curve is then used to monitor any refractive index changes.

Figure 13D:
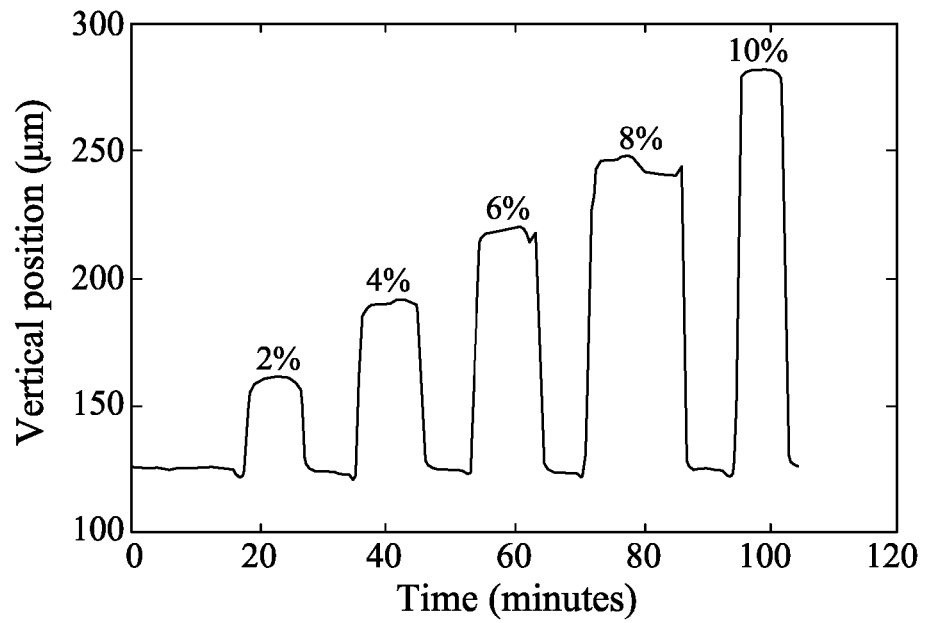
Figure 13E:
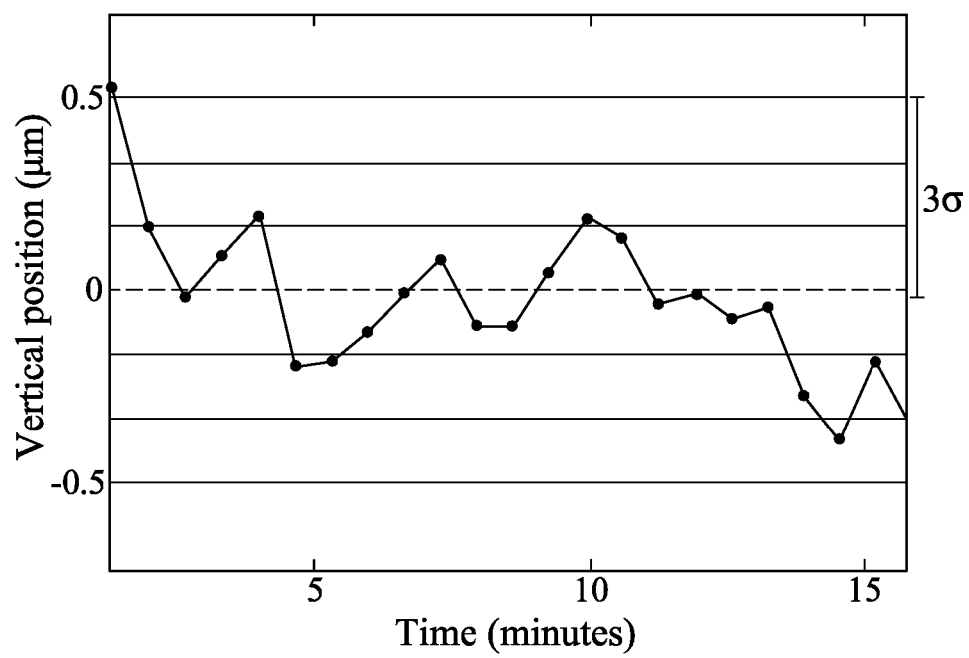

FIG. 13*d* is graph illustrating the change in position (in µm) of a peak intensity of the resonance 54 versus time (in minutes) for fluid in the form of different concentrations of glucose solutions (the respective peaks corresponding to 0%, 2%, 4%, 6%, 8% and 10% weight/volume glucose concentrations corresponding to a refractive index range of 1.3324 to 1.3444). By measuring the average shift from water (0% concentration) to each peak (2%, 4%, 6%, 8% and 10% concentrations), in this example it was possible to determine a sensitivity of 13667±692 µm/RIU. The dips/troughs before each position change are due to the fluid flow being reversed when changing the channel 188 into a new reservoir 190 (e.g. containing a glucose solution of a different concentration). There is a washing step with deionised water between the different glucose concentrations being analysed. With reference to FIG. 13*e*, which shows a graph of vertical position (in µm) of a peak intensity position of the resonance 54 over the first ~15 minutes, it is possible to determine a 3σ noise level, which in this example is 0.52 µm indicating a limit-of-detection of $4 \times 10^{-5}$ RIU.

The diffractive element 120 may be used for integrating the sensing and readout functions in a single device. In addition, the diffractive element 120 may be configured to provide functionality as an on-chip spectrometer. Considering the refractive index limit-of-detection of $4 \times 10^{-5}$ RIU described above, together with the sensitivity of 137 nm/RIU described above, it is possible to obtain a wavelength resolution of $\Delta\lambda=5.5$ μm. This value is equal or better than the wavelength resolution reported for other systems, e.g. a diffraction grating coupled with a smartphone camera ($\Delta\lambda=9$ μm has been reported in Gallegos et al., "*Label-free biodetection using a smartphone*", Lab Chip 13, pp. 2124-2132, 2013), or an integrated echelle grating ($\Delta\lambda=12$ μm has been reported in Ruocco et al., "*Silicon photonic spectrometer for accurate peak detection using Vernier effect and time-domain multiplexing*"; J. Lightwave Technol. 32(19), pp. 3351-3357, 2014).

Label-Free Detection of IgG Protein

A piranha solution (sometimes known as piranha etch) was used to clean and hydroxylate the $Si_3N_4$ of the diffractive element 20. The piranha solution was prepared with hydrogen peroxide ($H_2O_2$) and sulphuric acid ($H_2SO_4$) at a ratio of 1:3. This was followed by a rinse in de-ionised water, then isopropanol, and then drying with nitrogen gas. A silanisation treatment was performed immediately after the piranha cleaning process using a 0.5 ml to 19.5 ml mixture of APTES solution to ethanol. The APTES solution was 3-aminopropyl-triethoxysilane (440140, by Sigma Aldrich). The diffractive element 20 was placed in the APTES solution overnight, then removed and rinsed in ethanol before being dried with nitrogen gas. Phosphate-buffered saline (PBS) was prepared using P4417 tablets (by Sigma), and the pH measured and adjusted to either 5.4 or 7.3 using sodium hydroxide (NaOH). For the antibody immobilisation, NHS (N-Hydroxysulfosuccinimide sodium salt, 56485, by Sigma) and EDC (N-(3-Dimethylaminopropyl)-Nethylcarbodiimide hydrochloride, 03449, Sigma) were dissolved in PBS at pH 5.4 to concentrations of 10 mg/mL and 8 mg/mL, respectively. These were added to the antibody (Anti-Rabbit IgG, R2004, Sigma) which was dissolved in deionised water to a concentration of 50 μg/mL. This mixture was reacted for 20 minutes before being introduced to the diffractive element 20. IgG (15006, Sigma) was prepared via a 10× dilution series using PBS at pH 7.3. We assumed the molecular weight of IgG to be 150 kDa in the conversion from μg/mL to molar concentration.

To study the detection capability of an example of the sensor apparatus 40, the binding of an antigen to a corresponding antibody was measured. The diffractive element 20 was prepared by cleaning and hydroxylating the $Si_3N_4$ using piranha solution as described above, then silanising the surface using APTES (3-aminopropyl-triethoxysilane) as described herein; this preparation is thought to create free amine groups on the surface of the diffractive element 20. At this stage, the diffractive element 20 was encased in the PDMS flow channel to allow monitoring of antibody attachment. Next, the anti-rabbit IgG (Sigma R2004) was immobilised using the NHS-EDC protocol in PBS (phosphate-buffered saline) at pH 5.4, whereby a covalent bond may be formed between the carboxyl group on the antibody and the amine groups on the prepared diffractive element 20. The chosen antigen was purified rabbit-IgG (Sigma 15006), and which was prepared in various concentrations using PBS at a pH of 7.3.

Figure 14A:
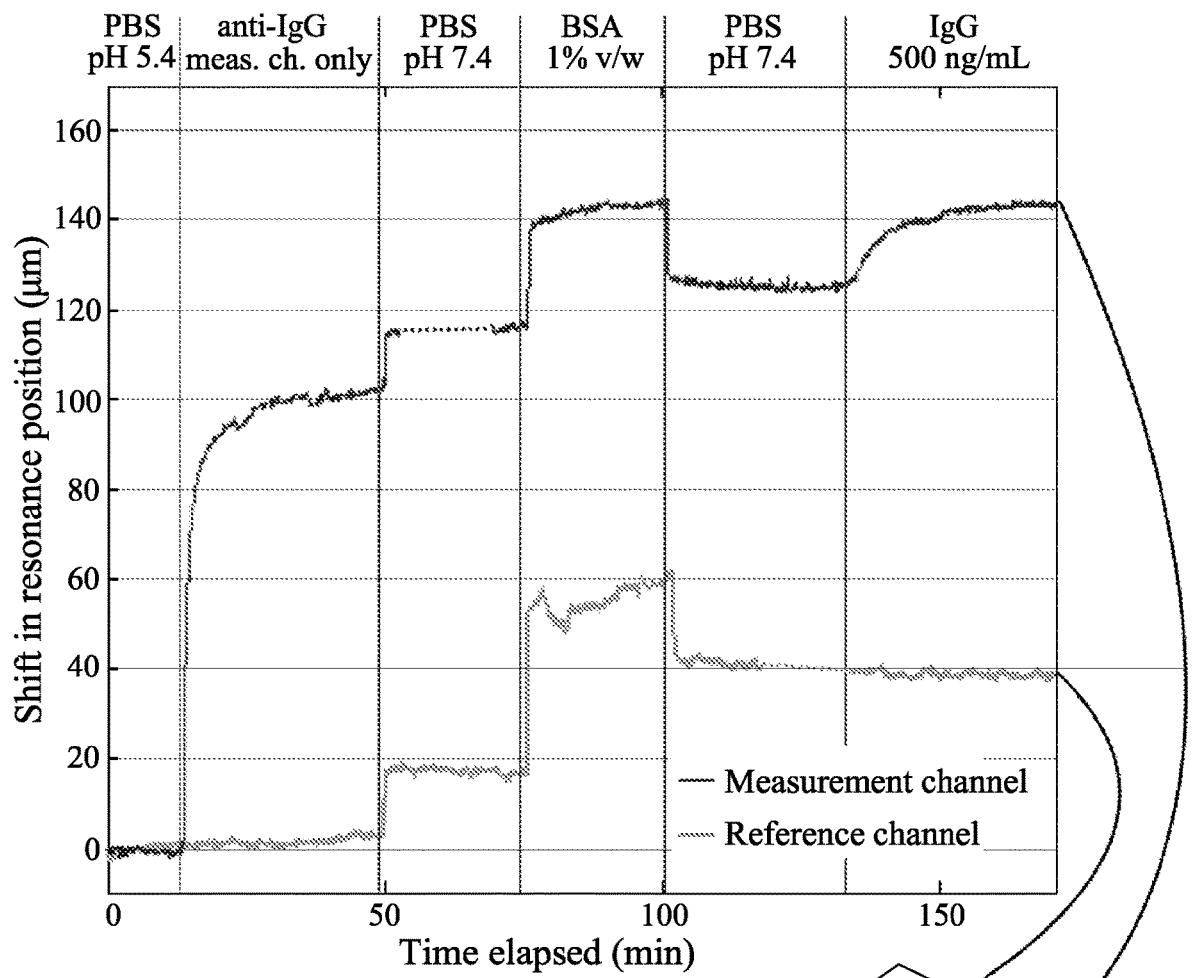
FIGS. 14a-14b respectively illustrate a graph of guided mode resonance position vs time for an IgG binding assay obtained from a sensing chip including an example diffractive element in accordance with the present disclosure.
Figure 14B:
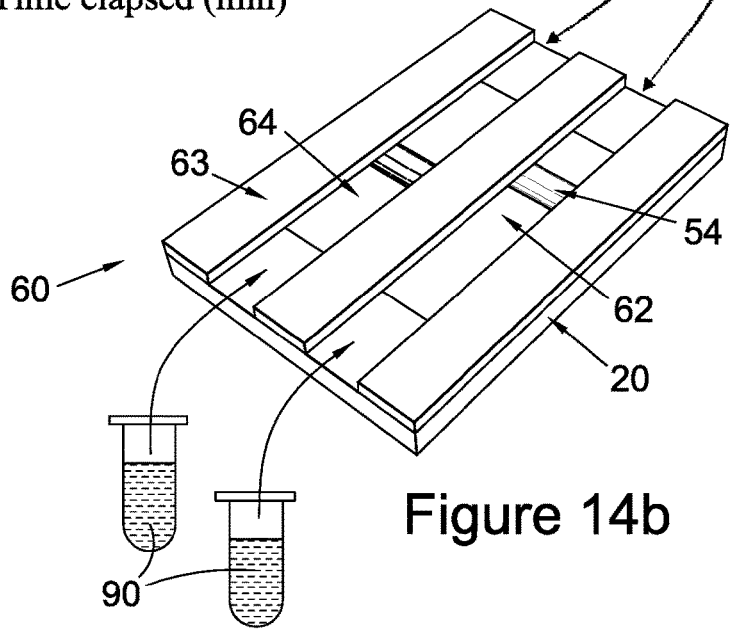

FIGS. 14a-b respectively show the shift in the resonance 54 position of a guided mode resonance on a diffractive element 20 against time as the IgG assay proceeds and a sensing chip 60 including the diffractive element 20. FIG. 14a shows the shift in resonance 54 position against times for both a measurement channel 62 (functionalised with anti-IgG) and a reference channel 64. The channels 62, 64 are defined between spaced-apart PDMS strips 63. In this example, analyte is moved through the channels 62, 64 by a single syringe pump (not shown) operating with two separate syringes (not shown), one for each channel 62, 64. The analyte for supplying each channel 62, 64 are stored in separate fluid reservoirs 90.

In the present example, after establishing a baseline with PBS at pH 5.4, there is a shift in the resonance position during antibody binding in the measurement channel 62 (the reference channel 64 is not exposed to the antibody solution). The anti-IgG binding curve saturates after ~30 min as the binding sites become used up. Antibody binding is followed with a PBS wash at pH 7.4, which induces a step change in both channels due to a higher bulk refractive index of the solutions. Next, a blocking buffer (bovine serum albumin (BSA), diluted to 1% w/v in PBS) is introduced, followed by a further wash in PBS. There is a resonance position shift caused by BSA binding in both channels 62, 64, showing that the nonspecific binding sites are being occupied by the BSA. Moreover, the shift is smaller in the measurement channel 62, which may be due to the antibody coverage therein. There are fewer nonspecific sites in the measurement channel 62 for the BSA to bind to. Finally, the IgG antigen (15006, Sigma) is introduced into both channels 62, 64, at a concentration of 500 ng/mL, diluted in PBS. In this example, The IgG is detected after only 2-3 minutes. The relatively short timescale for IgG detection may be regarded as being highly valuable in point-of-care applications. The lack of shift in the reference channel 64 indicates the site-specific binding of IgG antibody in the measurement channel 62.

DISCUSSION AND CONCLUSION

The applicant has demonstrated an example of a guided mode resonance sensor for biosensing applications that uses a chirped diffractive element 20. Resonance information may be encoded into spatial information on a single diffractive element, thus removing any requirement for a spectrometer or dispersive element in the set-up. Detection/measurement may be performed by imaging the diffractive element 20 onto a basic CMOS camera, and may not require a bespoke setup or smartphone attachment.

The sensor apparatus 40 may be stand-alone, compact, relatively robust, relatively easy to use, and/or relatively inexpensive to manufacture. Furthermore, the reflectance configuration may lend itself to interfacing with almost any type of analyte delivery method, and/or any appropriate medium for analysing.

Various modifications may be made to the diffractive element 20. For example, a chirp in two dimensions may be added without substantially increasing the complexity of the diffractive element. In examples where the detector includes a 2D array such as a CCD or CMOS detector, two-dimensional variations in the diffractive element 20 may be readily accommodated by any appropriate imaging technique.

It may be possible to harness the scalability of electron beam lithography and CMOS processing. Thousands of chirped diffractive elements 20 could be mass-produced from a single wafer of material, which may drastically lower production cost. It may be possible to manufacture the sensor apparatus 40 for less than 10 US$. Due to the example configuration of the system, where the guided mode resonance positioning may be self-referencing via the grating boundaries, no active alignment may be required and the diffractive element 20 may be easily replaced without the need for careful or tricky optical alignment.

Additionally/alternatively, because the spectral information may be encoded spatially and the system may operate at the single (or narrowband) wavelength, the spectral response of the detector may not be relevant. Compared to some prior examples where dispersion may be used as the transduction method, examples of the present disclosure may reduce at least one source of error. By operating at a single (or narrowband) wavelength, it may be possible to select the optimum wavelength for the detector, which may achieve an optimum signal-to-noise ratio. Furthermore, by forming a sensor array from individual chirped diffractive elements 20, it may be possible to image local variations in refractive index shifts at a video rate. This could potentially be a powerful tool for monitoring inhomogeneous substances such as biofilm growth, and/or for high-throughput drug screening by simultaneously probing many regions. Examples of the present disclosure may obviate the need to require sweeping of the incidence wavelength or the angle, and/or the need to provide a complex setup and/or relatively long acquisition times.

Despite the relatively simplicity of examples of the present disclosure, the sensor apparatus 40 may be considered to provide a relatively high performance. The sensitivity of 137 nm/RIU, LOD of $10^{-4}$ RIU, and/or the ability to detect nanomolar concentrations of a target molecule may already be considered sufficient for many practical applications. A sensor apparatus incorporating the chirped diffractive element 20 according to examples of the present disclosure may have utility as a diagnostics tool, either/both for clinical, home and many other bio-sensing (and/or other testing) applications.

Various modifications may be made to any of the apparatus, apparatus components, methods and/or preparations described herein, and which modifications may be within the scope of the present disclosure and/or within the scope of the claims.

The invention claimed is:

1. A sensor apparatus comprising:
a chirped diffractive element configured to produce a chirped response in an incident electromagnetic signal and support a plurality of guided mode resonances;
a housing for supporting the chirped diffractive element;
an illuminator configured for illuminating the chirped diffractive element with the electromagnetic signal;
a detector for detecting an electromagnetic signal coupled into at least one of the guided mode resonances supported by the chirped diffractive element, at least one of the guided mode resonances comprising a standing wave; and
the illuminator, detector and diffractive element arranged such that the angles of incidence and reflection of the optical signal are perpendicular or angled to the plane of the diffractive element.

2. The sensor apparatus of claim 1 wherein the chirped diffractive element is configured for coupling an incident electromagnetic signal into a guided mode resonance of the plurality of guided mode resonances, each guided mode resonance being supported by a refractive index value of a sample within a predetermined index range and the electromagnetic signal having a wavelength value within a predetermined wavelength range.

3. The sensor apparatus of claim 1, comprising a grating configured to support the plurality of guided mode resonances.

4. The sensor apparatus of claim 3, comprising a grating substrate for supporting the grating.

5. The sensor apparatus of claim 3, comprising at least one grating element.

6. The sensor apparatus of claim 5, wherein at least one grating element is configured to support the plurality of guided mode resonances.

7. The sensor apparatus of claim 6, wherein the at least one grating element is shaped to support the plurality of guided mode resonances.

8. The sensor apparatus of claim 5, comprising at least one section configured to support at least one of the plurality of guided mode resonances.

9. The sensor apparatus of claim 5, wherein the at least one grating element comprises at least one elongated grating element.

10. The sensor apparatus of claim 9, wherein at least one elongated grating element includes a dimension which varies along the elongated grating element.

11. The sensor apparatus of claim 10, wherein the at least one elongated grating element comprises a stepped profile for defining a varying dimension at regular intervals along the elongated grating element.

12. The sensor apparatus of claim 11, wherein the stepped profiles of adjacent elongated grating elements are co-aligned so that co-aligned grating portions of the elongated grating elements each include at least one equal or substantially equal dimension.

13. The sensor apparatus of claim 8, wherein the at least one section comprises at least one grating element shaped to support at least one of the guided mode resonances.

14. The sensor apparatus of claim 6, wherein a ratio between at least one dimension of the grating element and at least one dimension of a space between adjacent grating elements defines a fill-factor of at least a portion of the chirped diffractive element, wherein the chirped diffractive element comprises at least two sections having different fill-factors.

15. The sensor apparatus of claim 1, comprising an optical component, configured for directing the electromagnetic signal from the guided mode resonance to the detector.

16. The sensor apparatus of claim 1, wherein a reflected electromagnetic signal path defined between the diffractive element and the detector is perpendicular to an illuminating electromagnetic signal path defined between the illuminator and the diffractive element.

17. The sensor apparatus of claim 16, wherein the optical component is configured to direct the electromagnetic signal from the illuminator towards the chirped diffractive element and to direct the electromagnetic signal from the chirped diffractive element towards the detector.

18. The sensor apparatus of claim 1, comprising a substrate for supporting the diffractive element, wherein the substrate is oriented for allowing an incident electromagnetic signal to enter and traverse a portion of the substrate to illuminate the diffractive element and re-direct the electromagnetic signal, and for allowing re-directed electromagnetic signal to traverse and exit the substrate.

19. The sensor apparatus of claim 1, wherein the detector comprises an imaging device and optionally a focusing element for imaging the diffractive element onto the imaging device.

20. The sensor apparatus of claim 1, wherein the Illuminator comprises a narrowband or monochromatic spectral source.

21. A method of detecting an optical property of a sample, comprising:
chirping a diffractive element such that the diffractive element produces a chirped response in an incident electromagnetic signal;

coupling an electromagnetic signal into at least one guided mode resonance supported by the chirped diffractive element such that the angles of incidence and reflection of the optical signal are perpendicular or angled to the plane of the diffractive element and at least one of the guided mode resonances comprising a standing wave; and detecting a guided mode resonance.

22. The method of claim 21, comprising partitioning the diffractive element into a plurality of sections at least one of the sections being configured for supporting at least one guided mode resonance.

23. The method of claim 22, wherein at least one of the sections comprises a grating element is configured for supporting the at least one guided mode resonance.

24. The method of claim 21, comprising:
providing a sample at the chirped diffractive element;
illuminating the chirped diffractive element with the electromagnetic signal; and
imaging the chirped diffractive element to detect any reflected electromagnetic signal.

25. The method of claim 21, comprising determining a position of a guided mode resonance on the chirped diffractive element.

26. The method of claim 25, comprising determining the refractive index value by referring to a pre-calibrated data set indicating the position of a guided mode resonance for a refractive index value within a predetermined index range and for a wavelength within a predetermined wavelength range.

27. The method of claim 21, comprising performing an assay for determining a target property of a sample.

* * * * *

UNITED STATES PATENT AND TRADEMARK OFFICE
CERTIFICATE OF CORRECTION

PATENT NO. : 10,753,868 B2  Page 1 of 1
APPLICATION NO. : 16/310386
DATED : August 25, 2020
INVENTOR(S) : Christopher Reardon et al.

It is certified that error appears in the above-identified patent and that said Letters Patent is hereby corrected as shown below:

On the Title Page

Item [54], and in the Specification, Column 1 Line 1:
Before "Sensor And Associated Methods" insert --Improved--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*